(12) United States Patent
Aklilu

(10) Patent No.: US 11,645,925 B2
(45) Date of Patent: May 9, 2023

(54) COMPUTER-ASSISTED AERIAL SURVEYING AND NAVIGATION

(71) Applicant: ARKIDAN SYSTEMS INC., Edmonton (CA)

(72) Inventor: Noah Aklilu, Edmonton (CA)

(73) Assignee: ARKIDAN SYSTEMS INC., Edmonton (CA)

( * ) Notice: Subject to any disclaimer, the term of this patent is extended or adjusted under 35 U.S.C. 154(b) by 156 days.

(21) Appl. No.: 17/139,600

(22) Filed: Dec. 31, 2020

(65) Prior Publication Data

US 2021/0125510 A1 Apr. 29, 2021

Related U.S. Application Data

(62) Division of application No. 15/970,502, filed on May 3, 2018, now Pat. No. 10,916,150.

(51) Int. Cl.
```
G08G 5/00      (2006.01)
G01C 23/00     (2006.01)
G01C 21/20     (2006.01)
G06F 3/0482    (2013.01)
```

(52) U.S. Cl.
CPC ........... G08G 5/0047 (2013.01); G01C 21/20 (2013.01); G01C 23/005 (2013.01); G08G 5/003 (2013.01); G08G 5/0039 (2013.01); G08G 5/0086 (2013.01); G06F 3/0482 (2013.01)

(58) Field of Classification Search
CPC .... G08G 5/0047; G08G 5/003; G08G 5/0039; G08G 5/0086; G08G 5/0052; G08G 5/0021; G01C 21/20; G01C 23/005; G01C 11/02; G01C 23/00; G06F 3/0482
See application file for complete search history.

(56) References Cited

U.S. PATENT DOCUMENTS

| | | | | |
|---|---|---|---|---|
| 4,692,869 A * | 9/1987 | King | ......... | G01S 5/02 340/991 |
| 6,509,566 B1 * | 1/2003 | Wamsley | ............... | G01N 21/39 250/338.5 |
| 6,585,133 B1 * | 7/2003 | Brouwer | ............... | G01C 15/02 700/242 |
| 6,725,705 B1 * | 4/2004 | Huebler | ............... | G01M 3/243 73/592 |
| 6,822,742 B1 * | 11/2004 | Kalayeh | ............ | G01N 21/3504 356/432 |
| 7,834,806 B2 | 11/2010 | Tucker et al. | | |
| 8,413,039 B2 | 4/2013 | Casey | | |
| 8,694,184 B1 * | 4/2014 | Boorman | ............. | G06F 3/0481 715/810 |

(Continued)

OTHER PUBLICATIONS

Unknown author, "ForeFlight Intelligent Apps for Pilots", webpage, 4 pages, retrieved online Apr. 25, 2018: https://support.foreflight.com/hc/en-us/articles/115005085508-How-do-I-import-User-Map-Shapes-or-KML-Shape-files.

(Continued)

*Primary Examiner* — Mussa A Shaawat
(74) *Attorney, Agent, or Firm* — Aird & McBurney LP

(57) ABSTRACT

Computer-implemented methods, systems, and program products are provided that assist in aspects of aerial surveying, including selective display of planned flight path segments, marking of ground conditions, monitoring coverage of a planned flight path, and providing guidance information for aircraft navigation, including speed and turns.

18 Claims, 16 Drawing Sheets

(56) References Cited

U.S. PATENT DOCUMENTS

| | | | | |
|---|---|---|---|---|
| 8,886,459 B2* | 11/2014 | Stefani | | G01C 21/00 |
| | | | | 701/487 |
| 9,550,578 B2* | 1/2017 | McCullough | | G10L 15/22 |
| 10,410,291 B1* | 9/2019 | Binion | | G06Q 40/08 |
| 10,475,239 B1* | 11/2019 | Priest | | G03B 35/02 |
| 2004/0263852 A1 | 12/2004 | Degtiarev et al. | | |
| 2005/0010359 A1* | 1/2005 | Qureshi | | G01C 23/005 |
| | | | | 701/4 |
| 2008/0120122 A1 | 5/2008 | Olenski et al. | | |
| 2011/0301842 A1* | 12/2011 | Krupansky | | G08G 5/0034 |
| | | | | 701/411 |
| 2012/0016538 A1* | 1/2012 | Waite | | G05D 1/10 |
| | | | | 701/3 |
| 2012/0191333 A1* | 7/2012 | Sawhill | | G08G 5/0013 |
| | | | | 701/122 |
| 2013/0216089 A1* | 8/2013 | Chen | | G06T 7/0002 |
| | | | | 382/100 |
| 2014/0236390 A1* | 8/2014 | Mohamadi | | B64D 47/08 |
| | | | | 701/16 |
| 2015/0136897 A1 | 5/2015 | Seibel et al. | | |
| 2015/0226575 A1 | 8/2015 | Rambo | | |
| 2015/0353192 A1* | 12/2015 | Morrison | | B64D 31/06 |
| | | | | 244/17.23 |
| 2015/0363074 A1 | 12/2015 | Tsai et al. | | |
| 2016/0212345 A1 | 7/2016 | van Cruyningen | | |
| 2016/0214717 A1 | 7/2016 | De Silva | | |
| 2016/0299506 A1 | 10/2016 | Bruggeman et al. | | |
| 2016/0313734 A1 | 10/2016 | Enke | | |
| 2016/0364989 A1* | 12/2016 | Speasl | | G08G 5/0082 |
| 2017/0012697 A1* | 1/2017 | Gong | | G05D 1/0022 |
| 2017/0134963 A1* | 5/2017 | Priest | | B64C 27/06 |
| 2017/0248967 A1* | 8/2017 | Krogh | | G01S 17/88 |
| 2017/0248969 A1 | 8/2017 | Ham et al. | | |
| 2017/0329307 A1* | 11/2017 | Castillo-Effen | | B25J 9/163 |
| 2017/0358222 A1 | 12/2017 | Schubert | | |
| 2018/0047295 A1* | 2/2018 | Ricci | | G01S 5/02 |
| 2018/0181125 A1* | 6/2018 | Ceccom | | G08G 5/0082 |
| 2018/0244387 A1* | 8/2018 | Russell | | B64C 39/024 |
| 2018/0253110 A1 | 9/2018 | Tate | | |
| 2018/0255465 A1* | 9/2018 | Priest | | B64C 39/024 |
| 2018/0330027 A1 | 11/2018 | Sen et al. | | |
| 2019/0088144 A1* | 3/2019 | Argo | | B64C 39/024 |
| 2019/0161186 A1 | 5/2019 | Chen et al. | | |
| 2019/0204123 A1 | 7/2019 | Zhao et al. | | |
| 2019/0205644 A1* | 7/2019 | Birchbauer | | G05D 1/104 |
| 2019/0212741 A1 | 7/2019 | Lee et al. | | |
| 2019/0318633 A1 | 10/2019 | Huang et al. | | |
| 2019/0318636 A1 | 10/2019 | Gu | | |
| 2019/0340938 A1 | 11/2019 | Aklilu | | |
| 2020/0094938 A1* | 3/2020 | Seibel | | B64C 11/28 |

OTHER PUBLICATIONS

Unknown Author, "IT's Time for Foreflight 9:", webpage, 4 pages, retrieved online Apr. 25, 2018: https://foreflight.com/campaigns/9/.

Noah Aklilu, Synodon, Inc., Building a Powerful Remote Leak-Detection Platform for Aerial Surveys With the LabVIEW Real-Time Module, Multisim, and PXI, webpage, 2 page, retrieved online Apr. 25, 2018: http://sine.ni.com/cs/app/doc/p/id/cs-14744.

ESRI (company), "ArcGIS QuickCapture: The app for rapid data collection", online: <https://www.esri.com/en-us/arcgis/products/arcgis-quickcapture/overview>, retrieved Dec. 24, 2022.

* cited by examiner

| Planned Flight Path Segment | Start location (°N, °W) | End location (°N, °W) |
|---|---|---|
| 1 | 53.50, 113.50 | 53.60, 113.50 |
| 2 | 53.60, 113.50 | 53.65, 113.50 |
| 3 | 53.70, 113.45 | 53.80, 113.35 |
| .... | .... | .... |

| Ground condition entry | Ground condition location (°N, °W) | Ground condition type | Time stamp (date/time) | Additional surveyor-entered information |
|---|---|---|---|---|
| 1 | 53.80, 113.60 | Construction Activity (CA) | 2018-11-06 / 14:03 | Roadway construction in progress |
| | | | 2019-12-05 15:43 | Roadway construction completed |
| 2 | 53.90, 113.70 | Scour (SC) | 2018-11-06/ 16:30 | Severe scour |
| 3 | 53.95, 113.50 | Loss of Cover (LC) | 2018-11-06/ 16:45 | Trees removed |
| .... | .... | .... | .... | .... |

FIG. 4

| Preceding flight path segment? | $D_A$ (km) | $D_E$ (km) | $D_P$ (km) | θ (degrees) | Target Aircraft Speed | Turn Indicator |
|---|---|---|---|---|---|---|
| None (non-tracking) | (10, ∞) | - | - | Any case | Ferry | - |
| | (1, 10] | - | - | Any case | Cruise | - |
| | [0, 1] | - | - | [-15, +15] | Cruise | ↗ or ↖ |
| | | - | - | (+15, +90] [-90, -15) | Turn | ↻ or ↺ |
| | | - | - | (+90, +165] [-165, -90) | Turn | ↶ or ↷ |
| | | - | - | (+165, +180] [-180, -165) | Turn | ↙ or ↘ |
| Yes (tracking) | - | (1, ∞) | -- | -- | Cruise | -- |
| | - | [0, 1] | (1, ∞) | Any case | Cruise | ↰ or ↱ |
| | - | | [0, 1] | [-15, +15] | Cruise | ↗ or ↖ |
| | - | | | (+15, +90] [-90, -15) | Turn | ↻ or ↺ |
| | - | | | (+90, +165] [-165, -90) | Turn | ↶ or ↷ |
| | - | | | (+165, +180] [-180, -165) | Turn | ↙ or ↘ |

FIG. 15

COMPUTER-ASSISTED AERIAL SURVEYING AND NAVIGATION

CROSS-REFERENCE TO RELATED APPLICATION

This application is a divisional application of U.S. patent application Ser. No. 15/970,502, filed on May 3, 2018, and entitled COMPUTER-ASSISTED AERIAL SURVEYING AND NAVIGATION, the entire contents and disclosures of which are incorporated herein by reference.

FIELD OF THE INVENTION

The present invention relates to computer-implemented methods, systems, and program products that assist in aerial surveying, including more particularly, selective display of planned flight path segments, marking of ground conditions, monitoring coverage of a planned flight path, and providing guidance information for aircraft speed and turns.

BACKGROUND OF THE INVENTION

Regulations in some jurisdictions require periodic inspection of oil and gas pipeline right of ways for ground conditions and hazards that may affect pipeline operation and safety. Pipelines can be arranged in geometrically complex networks with tens of thousands of segments collectively spanning thousands of kilometers. Aerial surveying using either a fixed-wing plane or a helicopter is used to efficiently inspect these right of ways.

Conventional aerial surveying is challenging and error prone. The surveyor's attention is divided between observing ground conditions, recording them on the map, and communicating with the pilot to ensure the surveyor has an adequate opportunity to view the ground conditions. The pilot must fly the aircraft in a safe, comfortable, and efficient manner, while attempting to adhere to a planned flight path by controlling the aircraft's heading, and monitoring the ground for recognizable landmarks. However, landmarks can be sparse in featureless terrain. Moreover, the pilot must make numerous navigating decisions if the pipeline network is spatially dense such that many pipeline segments are traversed or visible within a short time frame. If the aircraft inadvertently misses a turn on the planned flight path, the aircraft will deviate significantly from the planned flight path, given the high speed and limited maneuverability of the aircraft. Making corrective turns to return towards missed portions of the planned flight path wastes time and fuel. On the other hand, not covering portions of the planned flight path compromises the integrity of the aerial survey.

Accordingly, there is a need in the art for systems and methods that assist in aspects of aerial surveying, including marking of ground conditions, monitoring of coverage of a planned flight path, and providing guidance information for aircraft navigation including speed and turns.

SUMMARY OF THE INVENTION

In one aspect, the present invention comprises a first method for displaying a planned flight path. The method is performed by a computer device and an operatively connected GPS receiver. The computer device comprises a display device, a computer processor, and a memory. The memory comprises at least one non-transitory computer-readable medium storing planned flight path data describing a location of each of a plurality of planned flight path segments in an ordered sequence. The method comprises the steps of periodically:
  (a) determining a current aircraft location, based on data from the GPS receiver;
  (b) identifying which one, if any, of the planned flight path segments is tracked (a "tracked flight path segment"), wherein the location of the tracked flight path segment is within a predetermined threshold distance of the current aircraft location; and
  (c) if the tracked flight path segment is identified, displaying a map on the display device, wherein the map shows the tracked flight path segment, and a predetermined number of the flight path segments that consecutively follow the tracked flight path segment in the ordered sequence, without showing any of the other flight path segments.

In an embodiment of the first method, the predetermined number of the flight path segments may be three or less.

In an embodiment of the first method, the predetermined number of the flight path segments is selectable by a user.

In an embodiment of the first method, the tracked flight path segment and the flight path segments that consecutively follow the current flight path segment are displayed in accordance with visually distinct visualization schemes.

In an embodiment of the first method, if no tracked flight path segment is identified, the method further comprises the steps of:
  (a) determining if a distance between the current aircraft location, and a location of one of the planned flight path segments (a "start distance") exceeds a predetermined threshold start distance; and
  (b) if the start distance exceeds the predetermined threshold start distance, displaying the map on the display device, wherein the map shows a region indicator based on the location of at least one of the planned flight path segments, without showing the planned flight path segments.

In another aspect, the present invention comprises a system for displaying a planned flight path. The system comprises a GPS receiver, and an operatively connected computer device. The computer device comprises a display device, a computer processor, and a memory comprising a least one non-transitory computer-readable medium. The memory stores planned flight path data describing a location of each of a plurality of planned flight path segments in an ordered sequence. The memory also stores a set of instructions executable by the computer device to implement the first method for displaying a planned flight path or an embodiment thereof, as described above.

In another aspect, the present invention comprises a non-transitory computer-readable medium storing a set of instructions executable by a computer device and an operatively connected GPS receiver. The computer device comprises a display device, a computer processor, and a memory storing planned flight path data describing a location of each of a plurality of planned flight path segments in an ordered sequence. When executed, the set of instructions implement the first method for displaying a planned flight path or an embodiment thereof, as described above.

In another aspect, the present invention comprises a second method for marking ground conditions during an aerial survey. The method is performed by a computer device and an operatively connected GPS receiver. The computer device comprises a pilot display device for viewing by a pilot, a surveyor display device for viewing by a surveyor, an input device for use by the surveyor, a computer processor, and a memory. The memory comprises at least one non-transitory computer-readable medium storing planned flight path data. The method comprises the steps of:
(a) periodically determining a current aircraft location based on data from the GPS receiver;
(b) periodically updating a map displayed by the pilot display device and the surveyor display device, wherein the map shows a marker for the aircraft at the determined current aircraft location in relation to the planned flight path; and
(c) in response to receiving, from the input device, a request to input new ground condition data:
  (i) determining a new ground condition location based on the determined current aircraft location;
  (ii) storing, in the memory, the new ground condition data comprising the determined ground condition location; and
  (iii) updating the map displayed by the pilot display device and the surveyor display device to show a marker for the new ground condition data at the determined new ground condition location.

In an embodiment of the second method, the new ground condition data further comprises a time, a date, or both the time and the date, at which the request to input new ground condition data is received.

In an embodiment of the second method:
(a) the method further comprises displaying, on the surveyor display device, a graphical user interface for inputting a request to input new ground condition data, wherein the graphical user interface comprises a plurality of selectable buttons each of which is associated with a different type of ground condition;
(b) the request to input new ground condition data is received upon one of the buttons being selected; and
(c) the type of ground condition associated with the selected one of the buttons is stored in the memory as part of the new ground condition data.

In an embodiment of the second method, the memory further stores previous ground condition data comprising a previous ground condition location, and the method further comprises the steps of:
(a) updating the map displayed by the pilot display device and the surveyor display device to show a marker for the previous ground condition data at the previous ground condition location; and
(b) in response to receiving, from the input device, a request to input an update to the previous ground condition data:
  (i) displaying, on the surveyor display device, a graphical user interface for inputting the update to previous ground condition data; and
  (ii) updating, in the memory, the previous ground condition data with the update to the previous ground condition data.

In an embodiment of the second method, the request to input the update to previous ground condition data is received upon the marker for the previous ground condition being selected using the input device.

In an embodiment of the second method, the computer device further comprises an auditor display device for viewing by an auditor, and wherein:
(c) step (b) further comprises updating the map displayed by the auditor display device; and
(d) step (c)(iii) further comprises updating the map displayed by the auditor display device.

In another aspect, the present invention comprises a system for marking ground conditions during an aerial survey. The system comprises a GPS receiver and computer device operatively connected to the GPS receiver. The computer device comprises a pilot display device for viewing by a pilot, a surveyor display device for viewing by a surveyor, an input device for use by the surveyor, a computer processor, and a memory comprising a least one non-transitory computer-readable medium. The memory stores planned flight path data. The memory also stores a set of instructions executable by the computer device to implement the second method for marking ground conditions during an aerial survey, or an embodiment thereof, as described above.

In another aspect, the present invention comprises a non-transitory computer-readable medium storing a set of instructions executable by a computer device and an operatively connected GPS receiver. The computer device comprises a pilot display device for viewing by a pilot, a surveyor display device for viewing by a surveyor, an input device for use by the surveyor, a computer processor, and a memory storing planned flight path data. When executed, the set of instructions implement the second method for marking ground conditions during an aerial survey, or an embodiment thereof, as described above.

In another aspect, the present invention comprises a third method for providing guidance information for piloting an aircraft. The method is performed by a computer device and an operatively connected navigation device comprising a GPS receiver and an electronic compass. The computer device comprises a display device, a computer processor, and a memory. The memory comprises at least one non-transitory computer-readable medium storing planned flight path data describing a start location and an end location of each of a plurality of planned flight path segments in an ordered sequence. The method comprises the steps of periodically:
(a) determining a current aircraft heading, based on data from the navigation device;
(b) determining a change in heading between the determined current aircraft heading and a heading of one of the planned flight path segments approached by the aircraft (the "approaching flight path segment"), based on the planned flight path data and the determined current aircraft heading; and
(c) determining a target aircraft speed, based on at least one rule stored in the memory relating the target aircraft speed to at least one factor comprising the determined change in heading; and
(d) displaying a speed guidance indicator on the display device, wherein a visual state of the speed guidance indicator depends on the determined target aircraft speed.

In an embodiment of the third method, the method further comprises the steps of periodically:
(a) determining a current aircraft location, based on data from the navigation device;
(b) determining an approach distance between the determined current aircraft location and a start location of the approaching flight path segment, based on the planned flight path data and the determined current aircraft location; and
wherein the at least one factor further comprises the determined approach distance.

In an embodiment of the third method, the method further comprises the steps of periodically:
(a) determining a current aircraft location, based on data from the navigation device; and
(b) determining an exit distance between the determined current aircraft location and an end location of one of the planned flight path segments that sequentially precedes the approaching flight path segment in the ordered sequence (the "preceding flight path segment"), based on the planned flight path data and the determined current aircraft location; and wherein the at least one factor further comprises the determined exit distance.

In an embodiment of the third method, the method may further comprise the step of periodically:
(a) determining an inter-path distance between the end location of the preceding flight path segment and the start location of the approaching flight path segment, based on the planned flight path data; and wherein the at least one factor further comprises the determined inter-path distance.

In an embodiment of the third method, the method further comprises the step of periodically:
(a) determining a current aircraft speed, based on data from the navigation device; and wherein the visual state of the speed guidance indicator depends on a comparison of the determined current aircraft speed to the determined target aircraft speed.

In an embodiment of the third method, the method further comprises the steps of periodically:
(a) determining a visual state of a turn indicator for display on the display device, based on at least:
  (i) a first rule that determines the visual state of the turn indicator to indicate a turn in a same direction as a direction of the change in heading if the magnitude of the change in heading is within a predetermined maximum value; and
  (ii) a second rule that determines the visual state of the turn indicator to indicate a turn in an opposite direction to the direction of the change in heading if the magnitude of the change in heading exceeds the predetermined maximum value; and
(b) displaying the turn indicator on the display device.

In another aspect, the present invention comprises a system for providing guidance information for an aircraft. The system comprises a navigation device comprising a GPS receiver and an electronic compass, and a computer device operatively connected to the navigation device. The computer device comprises a display device, a computer processor, and a memory comprising a least one non-transitory computer-readable medium. The memory stores planned flight path data describing a start location and an end location of each of a plurality of planned flight path segment in an ordered sequence. The memory also stores a set of instructions executable by the computer device to implement the third method for providing guidance information for piloting an aircraft, or an embodiment thereof, as described above.

In another aspect, the present invention comprises a non-transitory computer-readable medium storing a set of instructions executable by a computer device and an operatively connected navigation device comprising a GPS receiver and an electronic compass. The computer device comprises a display device, a computer processor, and a memory storing planned flight path data describing a start location and an end location of each of a plurality of planned flight path segments in an ordered sequence. When executed, the set of instructions implement the third method for providing guidance information for piloting an aircraft, or an embodiment thereof, as described above.

In another aspect, the present invention comprises a fourth method for monitoring coverage of a planned flight path by an aircraft. The method is performed by a computer device and an operatively connected GPS receiver. The computer device comprises a display device, a computer processor, and a memory. The memory comprises at least one non-transitory computer-readable medium storing planned flight path data. The method comprises the steps of:
(a) periodically determining a current aircraft location based on data from the GPS receiver;
(b) periodically determining a current field-of-view area location based on at least the current aircraft location;
(c) periodically evaluating which, if any, portion of the planned flight path is covered by the current field-of-view area location; and
(d) periodically updating a map displayed by the display device, wherein the map shows:
  (i) any portion of the planned flight path that has been covered by the field-of-view area location in accordance with a first coverage visualization scheme; and
  (ii) any portion of the planned flight path that has not been covered by the field-of-view area location in accordance with a second coverage visualization scheme that is visually distinct from the first coverage visualization scheme.

In an embodiment of the fourth method, the first and second coverage visualization schemes are visually distinct from each other in terms of one or a combination of color, pattern, or line weight.

In an embodiment of the fourth method, the map shows a marker for the determined field-of-view area at the determined current field-of-view area location.

In an embodiment of the fourth method, the method further comprises the steps of:
(a) periodically determining a metric indicative of the cumulative amount of the planned flight path or segment thereof that has been covered by the field-of-view area location; and
(b) periodically updating and storing the metric in the memory.

In an embodiment of the fourth method, wherein the method further comprises periodically displaying and updating the metric on the display device.

In an embodiment of the fourth method, the method further comprises the step of periodically updating a flight path tracking indicator displayed by the display device, wherein the flight path tracking indicator is shown in accordance with:
(c) a first tracking visualization scheme if any portion of the planned flight path is within the current field-of-view area location; or
(d) a second tracking visualization scheme if no portion of the planned flight path is within the current field-of-view area location, wherein the first and second tracking visualization schemes are visually distinct from each other.

In an embodiment of the fourth method, the first and second tracking visualization schemes are visually distinct from each other in terms of one or a combination of text, color, pattern, or shading.

In an embodiment of the fourth method, a shape, a size, or an orientation of the field-of-view area is user configurable.

In another aspect, the present invention comprises a system for monitoring coverage of a planned flight path by an aircraft. The system comprises a GPS receiver and computer device operatively connected to the GPS receiver. The computer device comprises a display device, a computer processor, and a memory comprising a least one non-transitory computer-readable medium. The memory stores planned flight path data. The memory also stores a set of instructions executable by the computer device to implement the fourth method for monitoring coverage of a planned flight path by an aircraft, or an embodiment thereof, as described above.

In another aspect, the present invention comprises a non-transitory computer-readable medium storing a set of instructions executable by a computer device and an operatively connected GPS receiver. The computer device comprises a display device, a computer processor, and a memory storing planned flight path data. When executed, the set of instructions implement the fourth method for monitoring coverage of a planned flight path by an aircraft, or an embodiment thereof, as described above.

Any one of the first, second, third, or fourth methods, their associated systems, their associated on-transitory computer-readable media, or aspects in embodiments thereof, as described above, may be combined in part or in whole with one or more of the other ones of the methods, systems or media, as the case may be.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 4 shows an embodiment of a data structure for storing ground condition data, in an embodiment of a method of the present invention.

FIG. 15 shows examples of rules that may be used to determine a target aircraft speed and a turn indicator in the method shown in FIG. 12.

DETAILED DESCRIPTION OF EMBODIMENTS OF THE INVENTION

Figure 1:
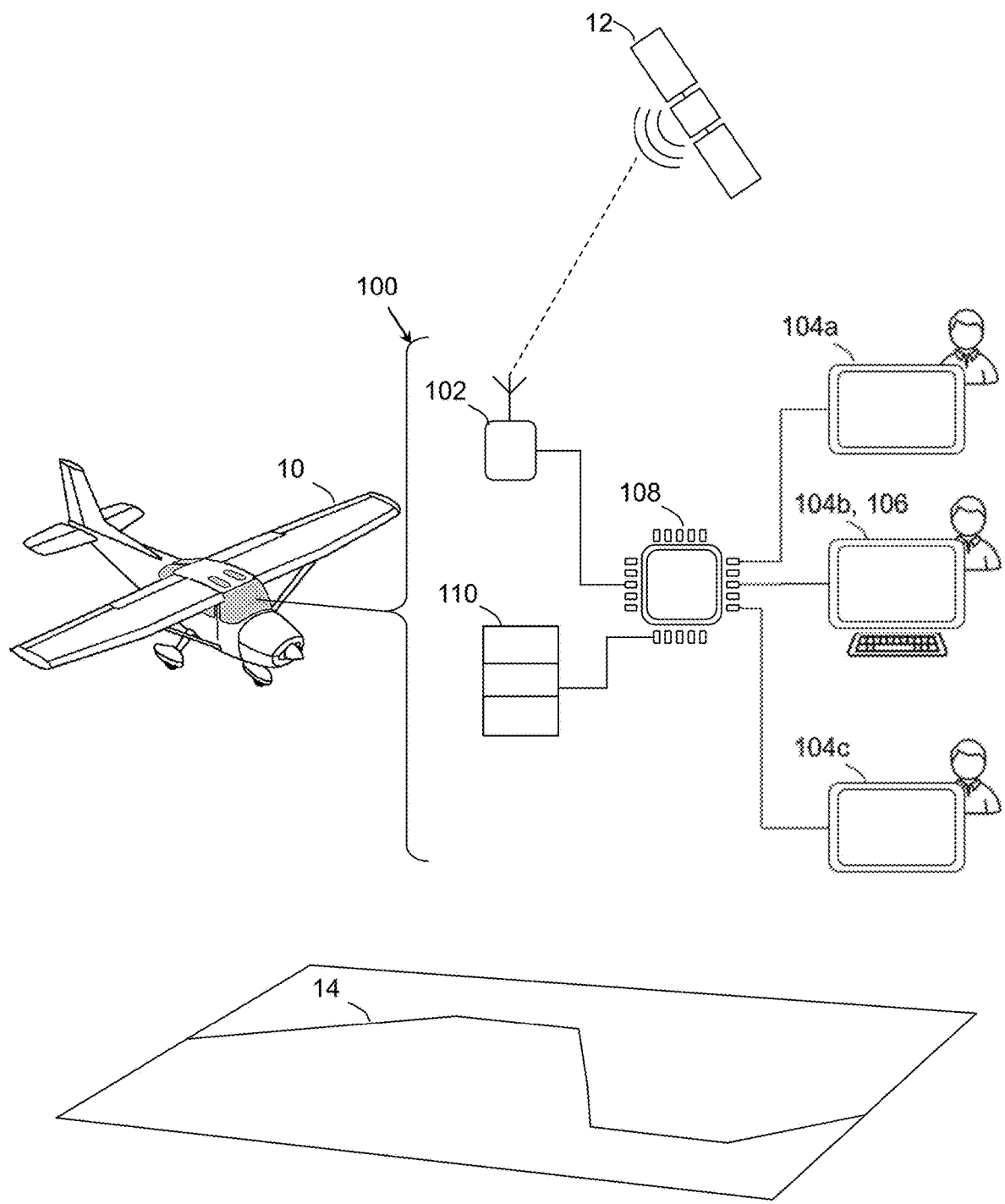
FIG. 1 depicts an embodiment of a system of the present invention onboard an aircraft and in communication with a GPS satellite transmitter, when conducting an aerial survey of the ground condition of an oil and gas pipeline right of way.

Definitions. Any term or expression not expressly defined herein shall have its commonly accepted definition understood by a person skilled in the art. As used herein, the following terms have the following meanings.

"Aircraft" includes both a fixed-wing plane, and a helicopter.

"Computer device" refers to a device that comprises at least one computer processor.

"Computer processor" refers to an electronic device that is capable of processing data in accordance with a set of instructions stored on a non-transitory computer readable medium. Non-limiting examples of a computer processor may include one or more devices commonly referred to as a programmable logic controller, a printed circuit board, an integrated circuit, a CPU, a microcontroller, and the like.

"Electronic compass" refers to a device that comprises or can be operatively connected to a computer processor to provide information about the geographical heading of an aircraft. Non-limiting examples of a compass include a magnetic compass, a gyrocompass, a magnetometer (e.g., a MEMS magnetic field sensor), or a GPS receiver. In the case of a GPS receiver having a single antenna, heading may be determined by calculating the displacement of the GPS receiver between two time instances, as known to persons of ordinary skill in the art of navigational devices. In the case of a GPS receiver having multiple antenna, heading may be determined by the position of the antenna relative to each other, as known to persons of ordinary skill in the art of navigational devices.

"Display device" refers to an electronic device that may be operatively connected to a computer processor to display information received from the computer processor in visual form. Non-limiting examples of a display device include monitors that comprise cathode ray tube (CRT) displays, light-emitting diode (LED) displays, liquid crystal displays (LCD), and projectors. A display device may be incorporated into an article wearable by a human user, such as a helmet, a head mount, or a pair of glasses.

"Ground condition" refers to any observable state of or activity occurring on a ground surface. Non-limiting examples of ground conditions include evidence of construction activity, erosion, ice effect, scour, seismic activity, soil slides, subsidence, vegetation cover, damage to or abnormal operation of the utility infrastructure, and unauthorized activities.

"GPS receiver" refers to an electronic device that is capable of receiving data from global positioning system satellites to determine the geographical position of the device.

"Input device" refers to an electronic device that can be operatively connected to a computer processor and used by a human to input data for use by the computer processor. Non-limiting examples of input devices include one or a combination of a keyboard, a pointing device (e.g., a computer touch pad, mouse, track ball, joystick), and a touchscreen layered on top of a display device.

"Navigation device" refers to a subsystem that includes a GPS receiver. In embodiments, a navigation device may further include an electronic compass.

"Non-transitory computer-readable memory" refers to a tangible medium capable of storing data and/or instructions in a format readable by a computer processor. Non-limiting examples of a non-transitory computer-readable memory include magnetic media, optical media, and solid-state media.

System. FIG. 1 depicts an embodiment of a system (100) of the present invention onboard an aircraft (10), and in communication with a GPS satellite transmitter (12), when conducting an aerial survey of the ground condition of an oil and gas pipeline right of way (14). This use of system (100) is non-limiting. The system (100) may be used to facilitate aerial surveying for other purposes.

In general, the system (100) includes a navigation device (102), and a computer device that includes at least one display device (104), an input device (106), a computer processor (108), and a memory (110) comprising a non-transitory computer readable medium, all of which are operatively connected to implement one or more methods of the present invention. In this embodiment, the system has three display devices: a pilot display device (104a) for viewing by a pilot onboard the aircraft (10); a surveyor display device (104b) for viewing by a surveyor onboard the aircraft (10); and an auditor display device (104c) for viewing by an auditor onboard the aircraft (10). The components of the system (100), and the methods implemented by them are now described in greater detail.

Navigation device. A purpose of the navigation device (102) is to acquire data that can be used to determine a geographic location and heading of the aircraft. The navigation device (102) includes a GPS receiver that receives data from global positioning system satellites (12). This data can be used to determine the geographical location of the navigation device (102). When the system (100) is onboard the aircraft, the position of the navigation device (102) will correspond to the position of the aircraft (10). The navigation device (102) queries the location of the aircraft at an update rate that allows for determination of the position of the aircraft (10) in real-time, given the expected speed of the aircraft (10) during the aerial survey. Preferably, the navigation device (102) has an update rate of at least about 10 Hz. Accordingly, for an aircraft (10) moving at a ground speed of about 150 km/hour or 41.7 m/s, the navigation device (102) can determine its location at intervals of less than about 4.17 m. Preferably, the navigation device (102) determines the location of the aircraft (10) with a high level of accuracy, such as within about one meter of the actual location of the aircraft (10).

In embodiments, the navigation device (102) may also include an electronic compass, which can be used to determine the heading of the aircraft (10). In embodiments, the electronic compass may include the aforementioned GPS receiver. Alternatively, in other embodiments, the electronic compass may include a magnetic compass, a gyrocompass, a magnetometer (e.g., a MEMS magnetic field sensor).

Figure 2:
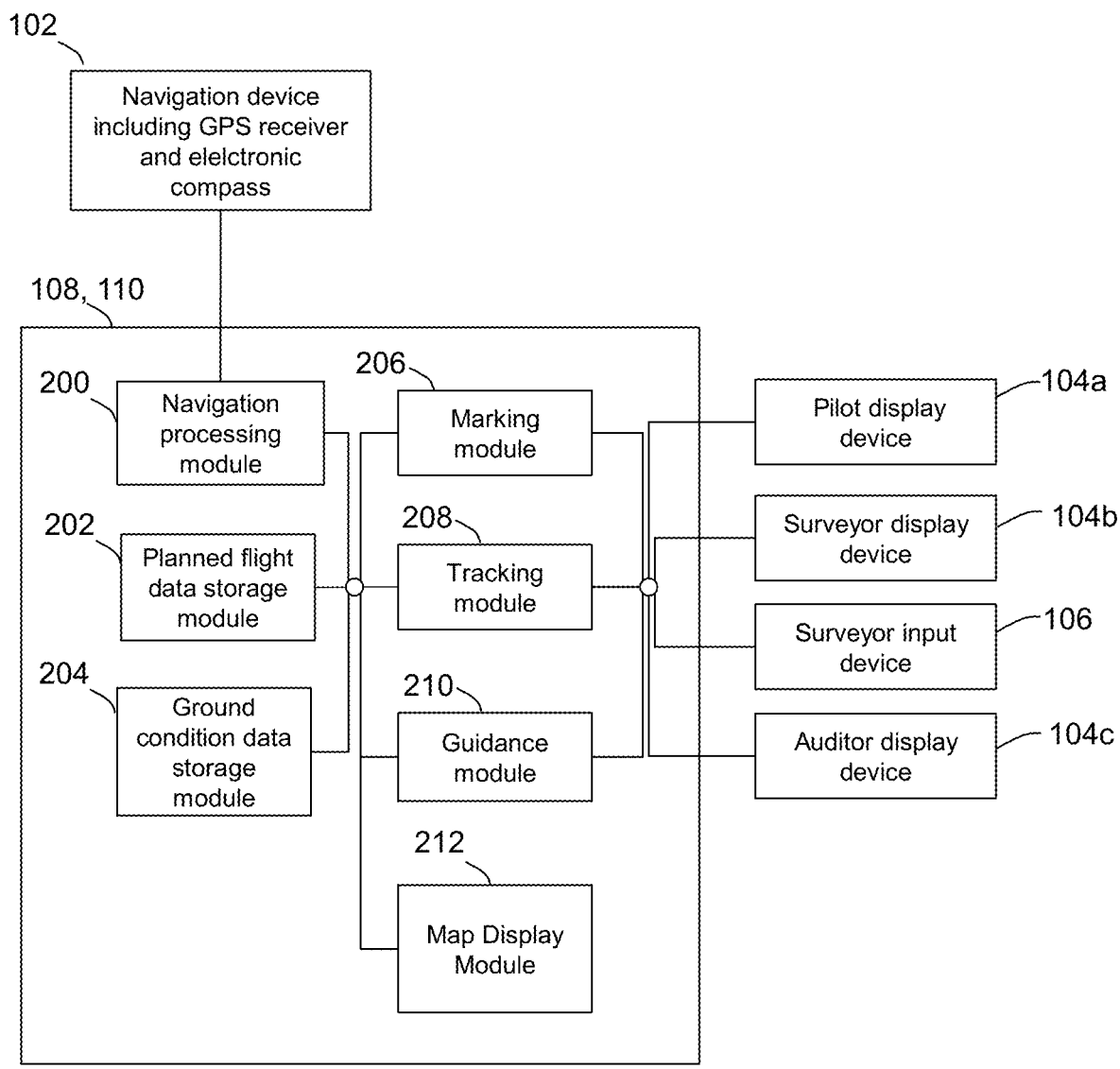
FIG. 2 shows a functional block diagram of an embodiment of a system of the present invention.

Computer device. FIG. 2 shows a functional block diagram of an embodiment of a computer device of the present invention. As noted above, the embodiment of the computer device includes a pilot display device (104a), a surveyor display device (104b), and an auditor display device (104c), for viewing by a pilot, surveyor, and an auditor, respectively, and a surveyor input device (106) for use by a surveyor, all operatively connected to each other, and, in use, situated onboard the aircraft (10). The computer processor (108) and the memory (110) are conceptualized as functional modules (200 to 210), which are implemented by a combination of hardware, software and/or firmware so that the computer device is specifically configured to perform functions, as described below.

In one embodiment, the computer processor (108), the memory (110), the surveyor display device (104b), and the surveyor input device (106), are provided in the form of a ruggedized laptop computer. For example, such a ruggedized laptop or tablet computer may include a LED screen for the surveyor display device (104b), a combination of a touchscreen and a keyboard for the surveyor input device (106), one or more integrated circuit chips for the computer processor (108), and a solid state hard drive for the memory (110). All of these components may be integrated into a housing that is constructed to withstand shocks and vibrations encountered during repeated use onboard an aircraft (10). Similarly, the pilot display device (104a) and the auditor display device (104c) may be provided in the form of ruggedized laptop computers or tablet computers. These laptop or tablet computers may communicate with each other via a network via a wired connection or a wireless connection.

The network may be a peer-to-peer network allowing the computers to share the computer processor (108) and memory (110) of one or more of the computers. Preferably, the laptop or tablet computers have a relatively compact form factor so that they can be conveniently installed in the cockpit and cabin areas of a small fixed wing aircraft or helicopter, without interfering occupancy of the aircraft (10) and access to the controls of the aircraft (10). As a non-limiting example, suitable laptop or tablet computers that may be adapted for use in the present invention include ruggedized Toughbook™ laptops and Toughpad™ tablet computers (Panasonic Canada Inc., Mississauga, Ontario, Canada.) The functions performed by the modules (200 to 210) of the computer device are now described in greater detail.

Navigation processing module. A purpose of the navigation processing module (200) is to interface with and process data from the navigation device (102) to determine the location of the aircraft (10). In one embodiment, the location of the aircraft (10) may be expressed in terms of longitudinal and latitudinal coordinates.

In embodiments of the system (100), the navigation processing module (200) also calculates a current speed of the aircraft (10) by repeatedly determining the geographical location of the aircraft (10) at a known time interval (e.g., as determined by a system clock of the computer device), determining the distance travelled between successively determined locations, and dividing this distance by the time interval.

In embodiments of the system (100), the navigation processing module (200) also interfaces with and processes data from the electronic compass of the navigation device (102) to determine a heading of the aircraft (10). For example, if the electronic compass includes a single antenna GPS receiver, the navigation processing module (200) may do so by repeatedly determining the geographical position of the aircraft (10), and determining the direction of travel between successively determined locations. Alternatively, the navigation processing module (200) may determine the current heading of the aircraft (10) based on the relative position of different antenna of a multiple antenna GPS receiver. Alternatively, the navigation processing module (200) may determine the current heading of the aircraft (10) from an electronic compass such as a magnetometer.

Planned flight data storage module. A purpose of the planned flight data storage module (202) is to allow for input and output of planned flight data to and from the memory (110). The planned flight data may be created as a computer file (e.g., a formatted text file). The planned flight data describes the geographical location of a planned flight path. The planned flight data may be generated either manually or with the assistance of computer algorithms that optimized planned flight paths.

Figures 3A, 3B:
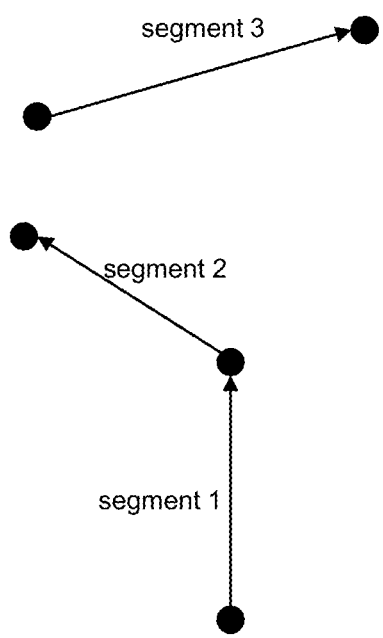
FIG. 3A shows an embodiment of a planned flight path.
FIG. 3B shows an embodiment of a data structure for storing planned flight data, in an embodiment of a method of the present invention.

FIG. 3A shows a non-limiting example of a planned flight path that is configured to allow for substantial coverage of a pipeline right of way, in an efficient manner. The planned flight path is made up of sequentially ordered planned flight path segments. FIG. 3B shows an embodiment of a corresponding data structure that may be used by the planned flight data storage module (202) to store the planned flight data in the memory (110). The data structure describes the flight path by an ordered sequence of geographical coordinates for the start location and end location of each planned flight path segment. In this example, each segment is described by a linear path extending between geographical start and end locations. In other examples, each segment may be described by other geometries such as curves. A segment may be continuous with the subsequent segment in the sense that the end location of the segment coincides with the start location of the subsequent segment, such as in the case of segments no. 1 and 2. Alternatively, a segment may be non-continuous with the subsequent segment in the sense that the end location of the segment does not coincide with the start location of the subsequent segment, such as in the case of segments no. 2 and 3. (The segments may be non-continuous with each other for a variety of reasons. For example, a pipeline network may have a geometrically complex tree-like structure, which results in the optimal planned flight path having non-continuous flight path segments.)

Ground condition data storage module. A purpose of the ground condition data storage module (204) is to allow for input and output of ground condition data to and from the memory (110). The ground condition data may be created as a computer file (e.g., a formatted text file). The ground condition data includes data that describes the geographical location of an observed ground condition. In embodiments, the ground condition data may also include data that describes a ground condition type, a time stamp for when the ground condition was recorded, and additional surveyor-entered data.

FIG. 4 shows a non-limiting example of data structure that may be used to store the ground condition data in the memory (110). In this example, the first ground condition data entry pertains to observed construction activity (CA), and is associated with two time stamps. The first time stamp and its associated surveyor-entered data were created during an initial aerial survey, while the second time stamp and its associated surveyor-entered data were created when updating the ground condition data during a subsequent aerial survey. The second and third ground condition data entries pertain to scour (SC) and loss of cover (LC), respectively, observed at different locations and at different times than the first ground condition data entry.

Marking module. A purpose of the marking module (206) is to facilitate visualization of ground condition data by the pilot and the surveyor, and to facilitate entry, updating, and storage of ground condition data by the surveyor, in real-time, while the aircraft (10) is in flight during an aerial survey.

Figure 5:
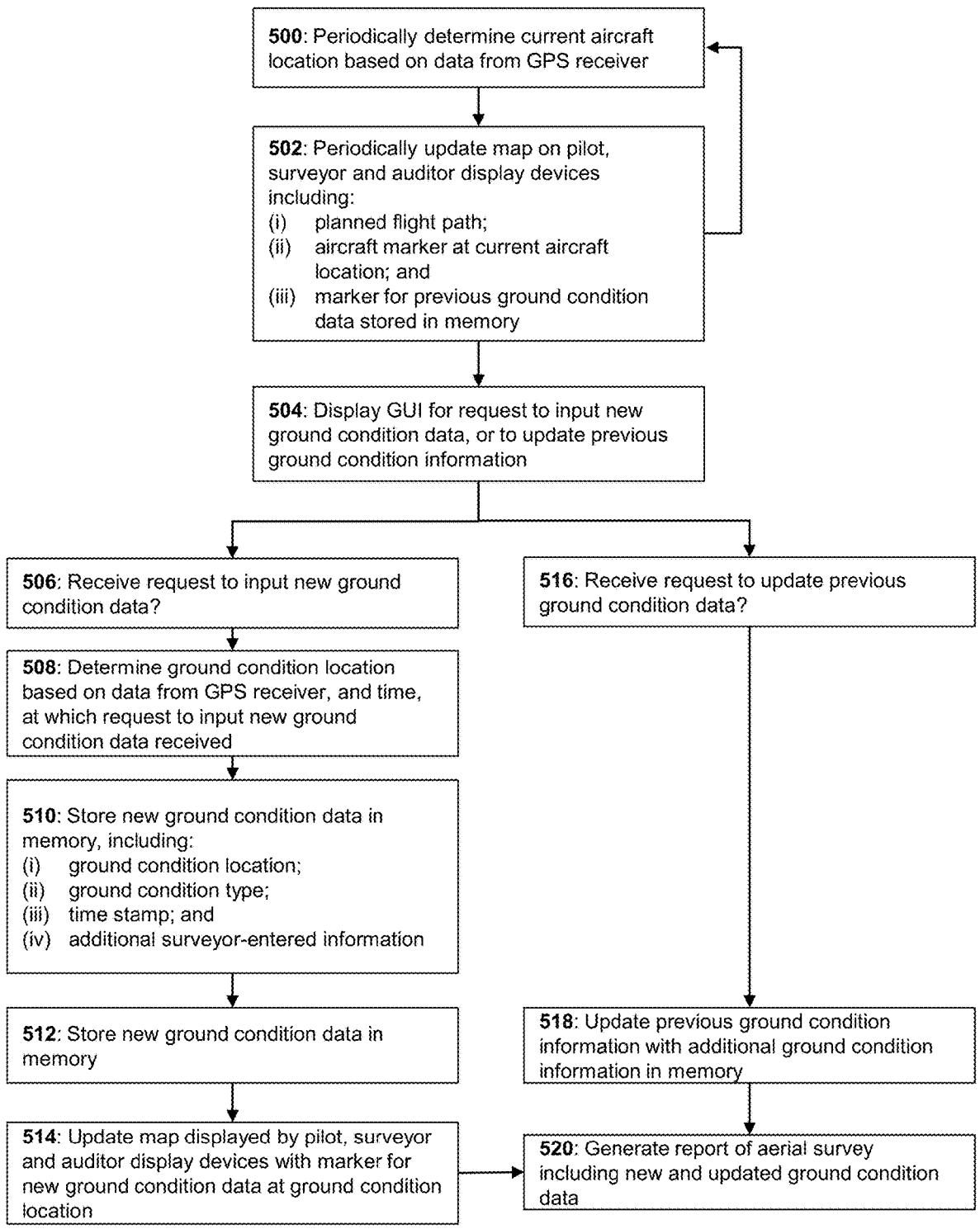
FIG. 5 shows a flow chart of an embodiment of a method for marking ground condition data, as implemented by a system of the present invention.
Figure 7:
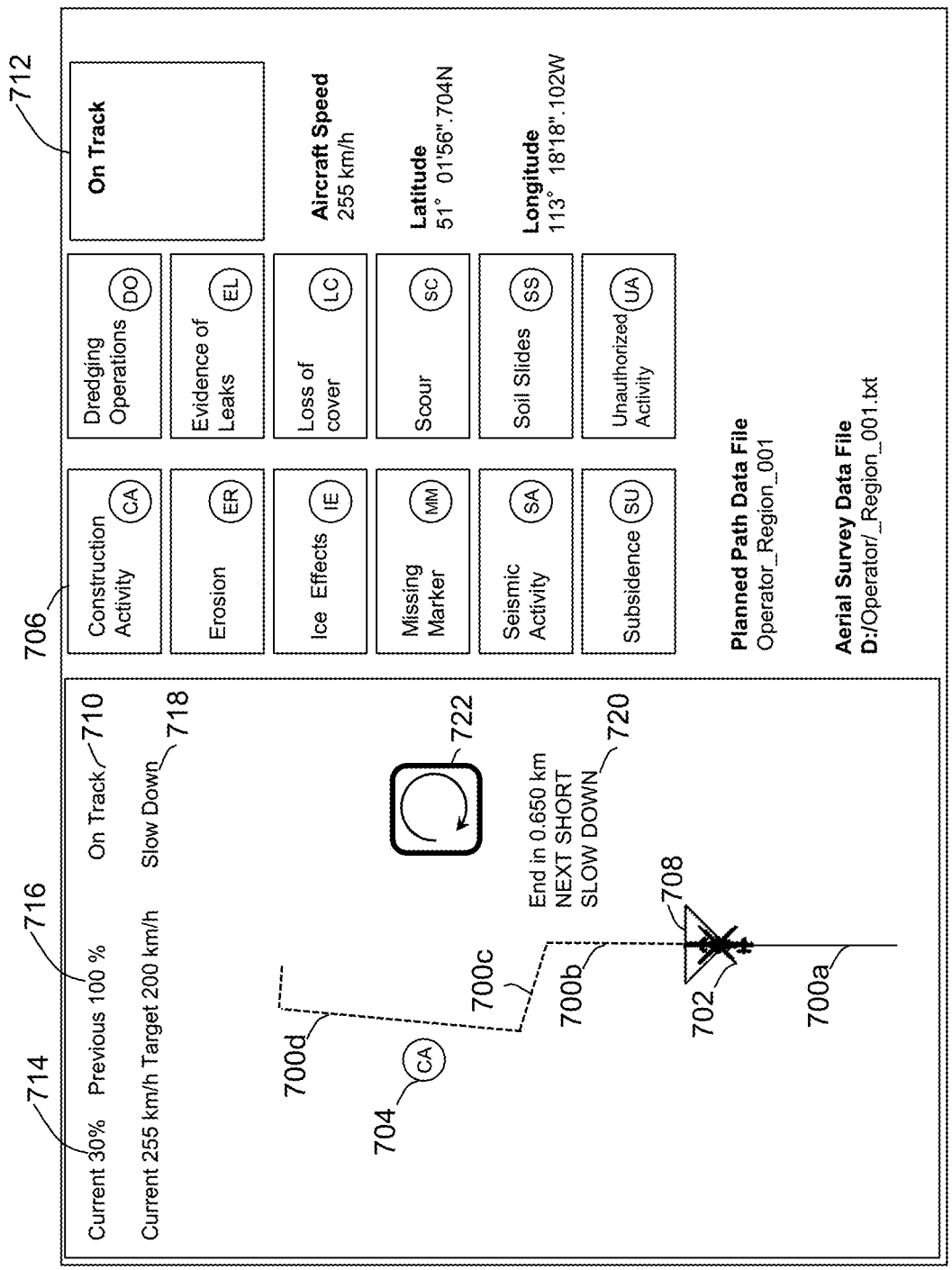
FIG. 7 shows an embodiment of a GUI displayed by a system of the present invention at a first time instance.

FIG. 5 shows a flow chart of an embodiment of a method performed by the marking module (206). The marking module (206) causes the navigation processing module (200) to periodically (e.g., on a 10 Hz frequency) determine the current location of the aircraft (10), based on data from the navigation device (102) (step 500). Based on the current location of the aircraft (10), the marking module (206) periodically updates a map displayed on the pilot, surveyor, and auditor display device (104c) (step 502). FIG. 7 shows an embodiment of a GUI shown on the surveyor display device (104b) that contains such map on the left hand side. The pilot display device (104a) and the auditor display device (104c) may show similar GUI's, but may show only the map so as to avoid distraction by non-essential data. In the embodiment shown in FIG. 7, the map shows segments (700a to 700d) of the planned flight path as described by the planned flight data stored in the memory (110). The map also shows an aircraft marker (702) in the form of a helicopter icon at the current aircraft location as determined by the navigation processing module (200). The map also shows a marker (704) for a previous ground condition data entry at its geographic location, as described by the ground condition data stored in the memory (110).

Figure 8:
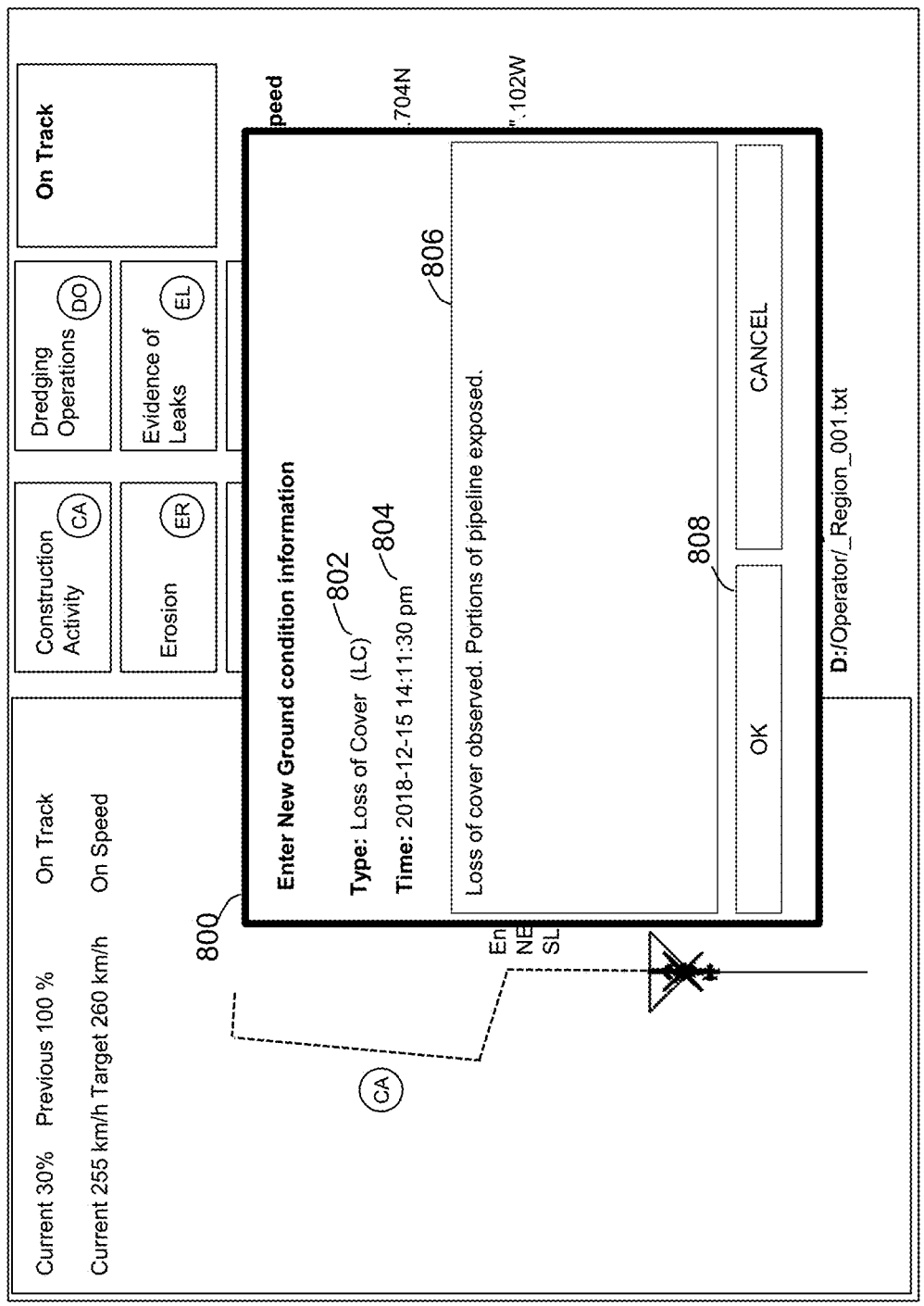
FIG. 8 shows an embodiment of a GUI displayed by a system of the present invention for entering new ground condition data.
Figure 9:
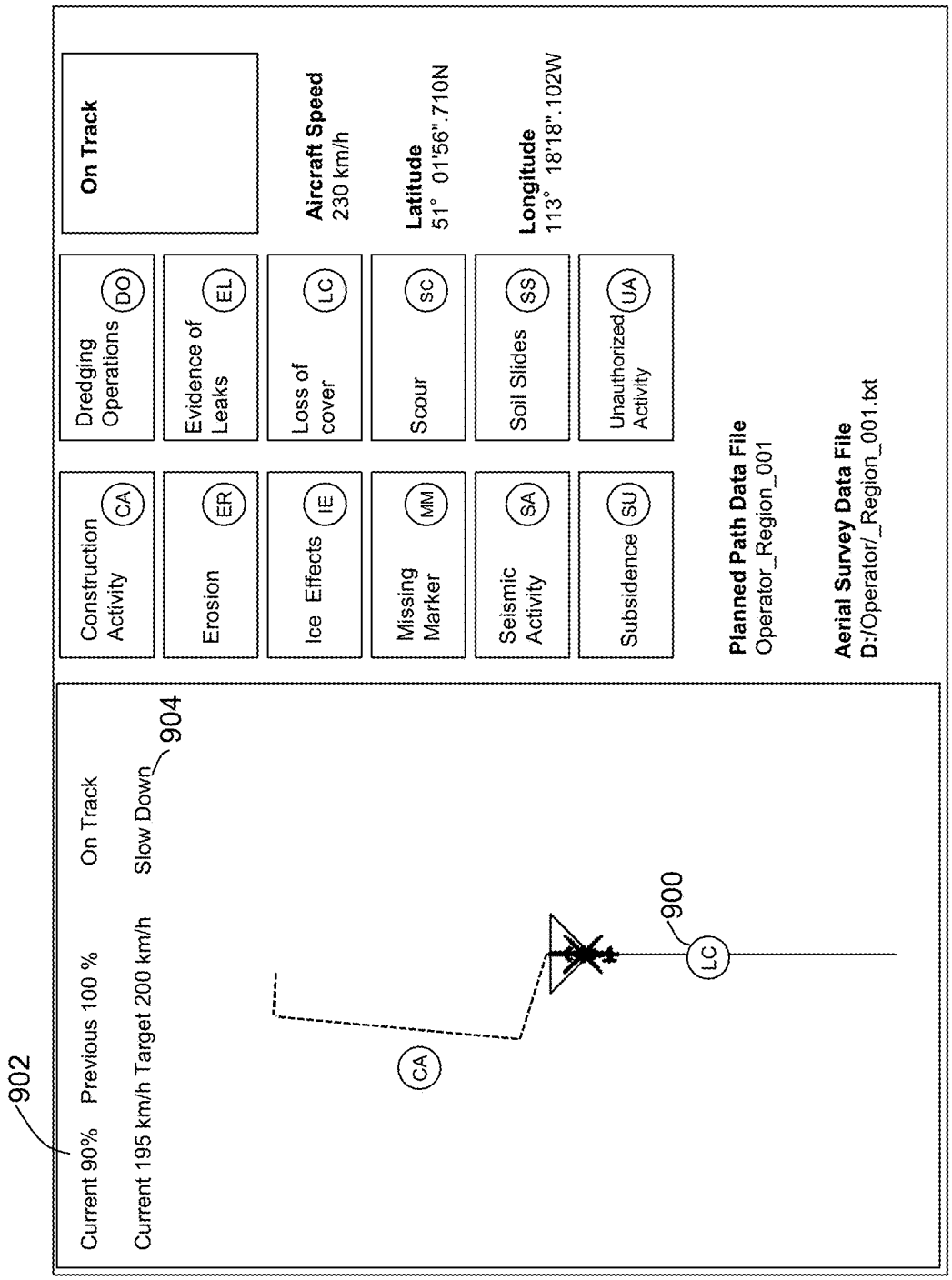
FIG. 9 shows the GUI of FIG. 7 at a subsequent instance in time, after new ground condition data has been entered.

The marking module (206) causes the surveyor display device (104b) to display a GUI for requesting input of new ground condition data (step 504). In the embodiment shown in FIG. 7, for example, this GUI is provided in the form a plurality of buttons (706), each of which is associated with a different type of ground condition: construction activity (CA); erosion (ER), ice effects (IE); missing marker (MM); seismic activity (SA); subsidence (SU); dredging operations (DU); evidence of leaks (EL); loss of cover (LC); scour (SC); soil slides (SS); or unauthorized activity (UA). The surveyor may use the surveyor input device (106) (e.g., a touchscreen layered on the surveyor display device (104b)) to select one of the buttons (e.g., by tapping on it), and thereby trigger a request to input new ground condition data (step 506). In response to doing so, the marking module (206) determines the ground condition location based on current location of the aircraft (10), as determined by the navigation processing module (200). The marking module (206) may also determine a time stamp (e.g., date and time) for the ground condition data entry from a system clock of the computer device (step 508). For example, in response to the surveyor selecting the button labelled "Loss of cover (LC)", the marking module (206) causes the surveyor display device (104b) to display a GUI (800) shown in FIG. 8 for inputting new ground condition data. The marking module (206) automatically populates the GUI with fields regarding the ground condition type (802) associated with the selected button (i.e., Loss of cover (LC)), and the time stamp (804). The GUI includes a text box (806) allowing the surveyor to enter additional data about the observed ground condition using the surveyor input device (106). When the surveyor has finished entering the additional data, the surveyor selects the button labelled "OK" (808) (e.g., by tapping on it, or typing an "enter" key on a keyboard), whereupon the ground condition location, the ground condition type, the time stamp, and the surveyor-entered data are stored by the ground condition data storage module (204) in the memory (110). Further, as shown in FIG. 9, the map is updated on the surveyor display device (104b), the pilot display device (104a), and the auditor display device (104c) to show a marker (900) labelled (LC) for the newly entered ground condition. The marker (900) is shown on the map at the location corresponding to the location of the aircraft (10) when the operator selected the button labelled "Loss of cover (LC)", even though time will have elapsed between that time, and the instant at which the surveyor selects the button labelled "OK" (808). The marker (808) provides a visual confirmation to the pilot, surveyor, and the auditor that the new ground condition data has been entered, with reduced need for communication between them.

Figure 10:
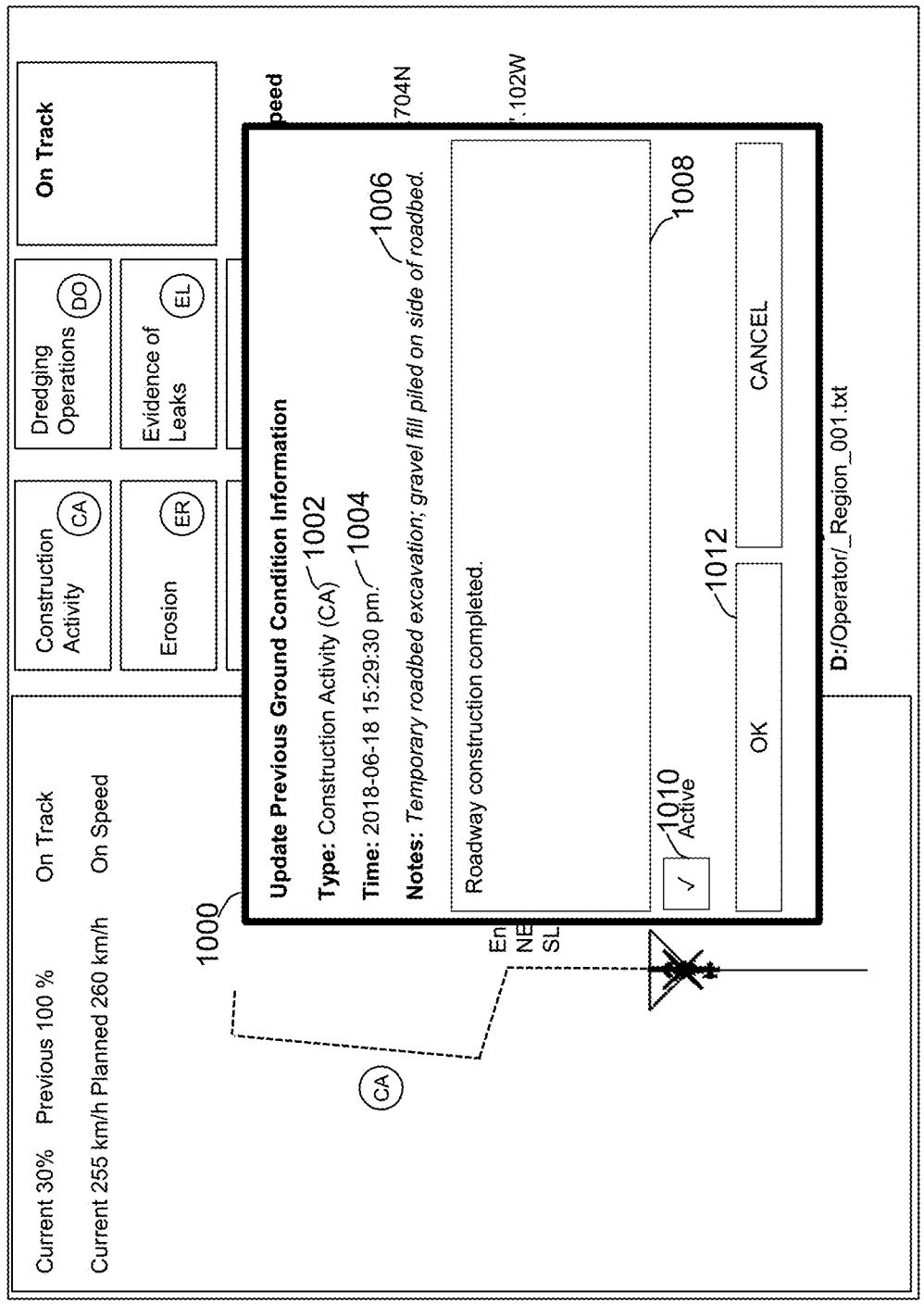
FIG. 10 shows an embodiment of a GUI displayed by a system of the present invention for updating previous ground condition data.

The marking module (206) may also cause the surveyor display device (104b) to display a GUI to the surveyor to request updating previous ground condition data (step 504). In the embodiment shown in FIG. 7, for example, this GUI is provided in the form of the marker (704) labelled (CA) displayed on the map based on the geographic location for a previous ground condition entry stored in the memory (110). The surveyor may use the surveyor input device (106) (e.g., a touch screen layered on the surveyor display device (104b)) to select the marker (704) (e.g., by tapping on it), and thereby trigger a request to update previous ground condition data stored by the ground condition data storage module (204) (step 516). In response to doing so, the marking module (206) accesses the memory (110) to retrieve the previous ground condition entry, and causes the surveyor display device (104b) to display a GUI (1000), as shown in FIG. 10, for updating the previous ground condition data. The marking module (206) automatically populates the GUI (1000) with the previous ground condition data in fields for the ground condition type (1002), the previous time stamp (1004), and the previous surveyor-entered data (1006). The GUI includes a text box (1008) allowing the surveyor to input updated data about previous ground condition using the surveyor input device (106). The GUI also includes a selectable check box (1010) labelled "Active". If the previously entered ground condition is no longer pertinent, the surveyor may "uncheck" the checkbox so that this ground condition entry is no longer displayed on the map, or so that this ground condition is displayed on the map in a visually distinct manner. When the surveyor has finished entering the updated data, the surveyor selects the button labelled "OK" (1012) (e.g., by tapping on it, or typing an "enter" key on a keyboard), whereupon the previous ground condition data is appended with the updated surveyor-entered data, and a current time stamp as determined from a system clock of the computer device (step 518).

At the conclusion of the aerial survey, the marking module (206) may generate a report (e.g., in the form a computer file, such as a formatted text message) that includes the newly entered and updated ground condition data stored in the memory (110) (step 520).

Tracking module. A purpose of the tracking module (208) is to facilitate the surveyor, the pilot or an auditor in tracking, in real time during an aerial survey, the degree to which the planned flight path has been "covered". In this context, "coverage" (and like terms) refers to planned flight path having been intersected by a notional field-of-view (FOV) area of the surveyor onboard the aircraft (10).

Figure 6:
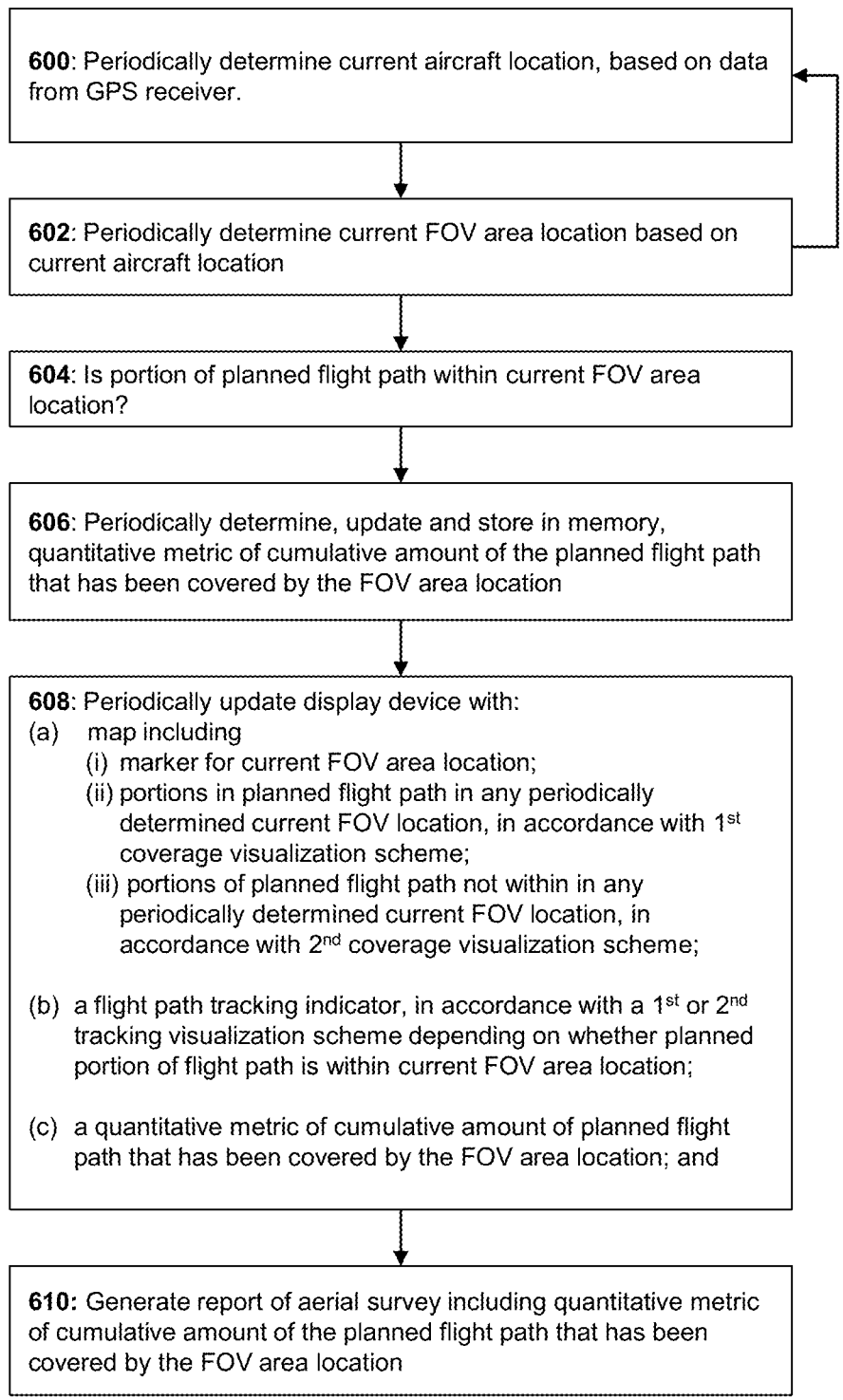
FIG. 6 shows a flow chart of an embodiment of a method for monitoring field-of-view coverage of a planned flight path, as implemented by a system of the present invention.

FIG. 6 shows an illustrative embodiments of a method performed by the tracking module (208). This tracking module (208) causes the navigation processing module (200) to periodically (e.g., on a 10 Hz frequency) determine the current location of the aircraft (10) and the current aircraft speed, based on data from the navigation device (102) (step 600).

Based on the current location of the aircraft (10), the tracking module (208) periodically determines a current FOV area location (step 602). The current FOV area has a predetermined geometric size and shape, in relation to the aircraft (10), which is stored in the memory (110). Therefore, the location of the current FOV area may be readily calculated using geometric relationships and the current location of the aircraft (10). For example, as shown in the GUI of FIG. 7, the FOV area is represented by a region (708) of a predetermined size and triangular shape that projects from the front of the helicopter icon, and approximates the expected portion of the ground that is visible to a surveyor onboard the helicopter looking out the front window of the helicopter, when at a certain altitude. This triangular region can be represented by three sets of longitudinal and latitudinal coordinates for its vertices. In embodiments of the system (100), the geometry of the FOV area may be adjusted by the user, to account for a variety of factors, such as different types of aircraft having different viewing windows, the expected altitude and speed of the aircraft (10), and the desired "resolution" of the aerial survey. For instance, in comparison to a low resolution survey, the FOV area may be made smaller for a high resolution survey to track deviation of the actual flight path from the planned flight path within smaller tolerances.

As the aerial survey proceeds, the tracking module (208) periodically evaluates whether any portion of the planned flight path is covered the periodically determined current field-of-view area location (step 604). Since the current FOV area location can be defined by geometric coordinates as described above, the tracking module (208) can test whether a portion of the planned flight path geometrically intersects the current FOV area. This determination can be based on mathematical relationships, which can be determined by a person skilled in the art of computational geometry. Moreover, since the current FOV area has a predetermined size, the tracking module (208) can determine a quantitative metric of the cumulative amount of the flight path that has been within any periodically determined FOV area location. This amount may be expressed as a percentage of the length of the entire planned flight path, or of a segment thereof. As the aerial survey proceeds in real-time, the tracking module (208) can update and store this metric in the memory (110) (step 606).

As the aerial survey proceeds, the tracking module (208) may also cause one or a combination of the pilot display device (104a), the surveyor display device (104b), and the auditor display device (104c) to display a variety of information that facilitates the pilot, surveyor, or auditor, to determine whether the aircraft (10) is properly covering the planned flight path (step 610).

For example, as shown in the GUI of FIG. 7, the map shows a marker (708) corresponding to the current FOV area location. The map may also show portions of the flight path that have been "covered", and portions of the flight path that have not been "covered" according to first and second coverage visualization schemes, respectively. The first and second coverage visualization schemes are visually distinct from each, and may differ in respect to color, pattern, or line weight, or other visual quality discernible to a human viewer. In FIG. 7, for example, the portion of the planned flight path that has been "covered" is shown with a solid line, whereas the portion of the planned flight path that has not been "covered" is shown with a dashed line. (The solid and dashed lines may represent different colors.) As the aerial survey proceeds, portions of the planned flight path that are "covered" are dynamically updated to be shown with a solid line. In contrast, in FIG. 9, the aircraft (10) has covered a greater portion of one of the segments of the planned flight path, resulting in a greater amount of the planned flight path being shown with a solid line.

Figure 11:
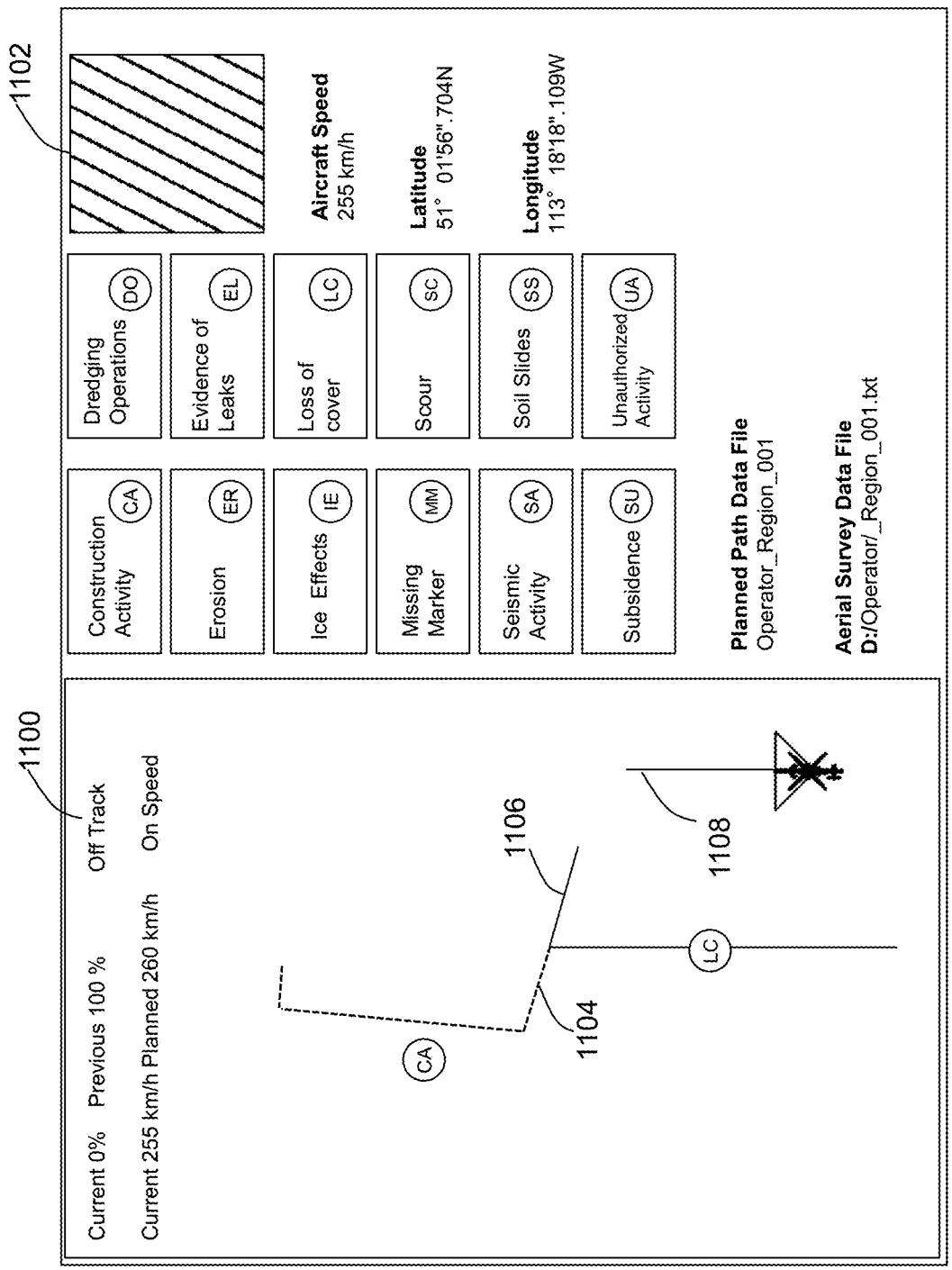
FIG. 11 shows the GUI of FIG. 7 at a subsequent instance in time, when the aircraft is off-track of a planned flight path.

The GUI may also show a flight path tracking indicator in accordance with visually distinct first and second flight tracking visualization schemes, which may differ in respect to color, pattern, line weight, text, or other quality discernible to a human viewer. The selection between the first and second flight tracking visualization schemes depends on whether any portion of the planned flight path is covered by the current FOV area location. In FIG. 7, for example, the GUI has text field (710) displaying "On Track" and a rectangular region (712) displaying "On Track" because the current FOV area location as shown by marker (708) intersects a portion of the planned flight path. In contrast, FIG. 11 shows the GUI when the current FOV area location is not intersected by any portion of the planned flight path. The text field (1100) has changed to "Off Track" and the rectangular region (1102) has become shaded (e.g., the shading may represent a color change from green to red). Accordingly, these indicators alert the viewer that the current FOV area location is not covering the planned flight path.

In the embodiment shown in FIG. 11, the GUI also displays a lead-in line (1106) as the aircraft (10) approaches the next planned flight path segment (1104) to be tracked in the ordered sequence stored in the planned flight path data. The lead-in line (1106) is aligned with the flight path segment (1104) and projects from the start point of that flight path segment by a specified distance (e.g., 1 km). The GUI also displays a projection line (1108) that extends forward from the aircraft marker, and is aligned with the heading of the aircraft (10) (e.g., as may be determined by the navigation processing module (200)). The lead-in line (1106) and the projection line (1108) collectively assist a pilot on guiding the aircraft (10) into alignment with the next planned flight path segment (1104) as it is approached by the aircraft (10).

Preferably, the lead-in line (1106) and the projection line (1108) have a different visual appearance on the display device (e.g. in terms of color, pattern, or line weight).

The GUI may also show the quantitative metric of cumulative amount of planned flight path that has been within any periodically determined current FOV area location. FIG. 7, for example, shows this metric on the basis of individual segments of the planned flight path.

The upper region of the map has two text fields. The first field (714) displays "Current 30%", which indicates that the aircraft (10) has covered 30 percent of the segment of the planned flight path that is currently being tracked by the aircraft (10). The second text field (716) displays "Previous 100%", which indicates that the aircraft (10) has covered all of the previous segment of the planned flight path. In contrast, in FIG. 9, the first text field (902) is updated to display "Current 90%", indicating that the aircraft (10) has covered a greater amount of the segment of the planned flight path that is currently being tracked by the aircraft (10).

At the conclusion of the aerial survey, the tracking module (208) may generate a report (e.g., in the form a computer file, such as a formatted text message) that includes the quantitative metric of cumulative amount of the planned flight path that has been within any periodically determined current FOV area location (step 610).

Guidance module. It is difficult for a pilot to mentally determine when and how to modulate the speed of the aircraft (10) and make turns, since there may be few recognizable landmarks to serve as reference points that help understand where the aircraft (10) is situated in relation to the planned flight path segments. Given the high speed of the aircraft (10), delay in taking such actions, or taking suboptimal actions, may result in the aircraft (10) deviating excessively from the planned flight path. This may necessitate making abrupt corrective turns, which costs time and fuel, reduces flight comfort, and may compromise coverage of the planned flight path. When a planned flight path includes hundreds or thousands of turns, the cumulative effect of missed or suboptimal flight actions can be substantial.

A purpose of the guidance module (210) is to determine and display a speed guidance indicator on the display device (104a) that assists the pilot, in real time during an aerial survey, to adhere to a target aircraft speed—i.e., a recommended speed for the aircraft at an instance of time. Another purpose of the guidance module (210) is to determine and display a turn indicator on the display device (104a) that provides the pilot, in real time during an aerial survey, with visual notification of imminent turns. By doing so, the guidance module (210) better ensures that the surveyor has an adequate opportunity to observe ground conditions, that deviations of the actual flight path from the planned flight path are minimized, and that the planned flight path is covered in an efficient manner.

Figure 12:
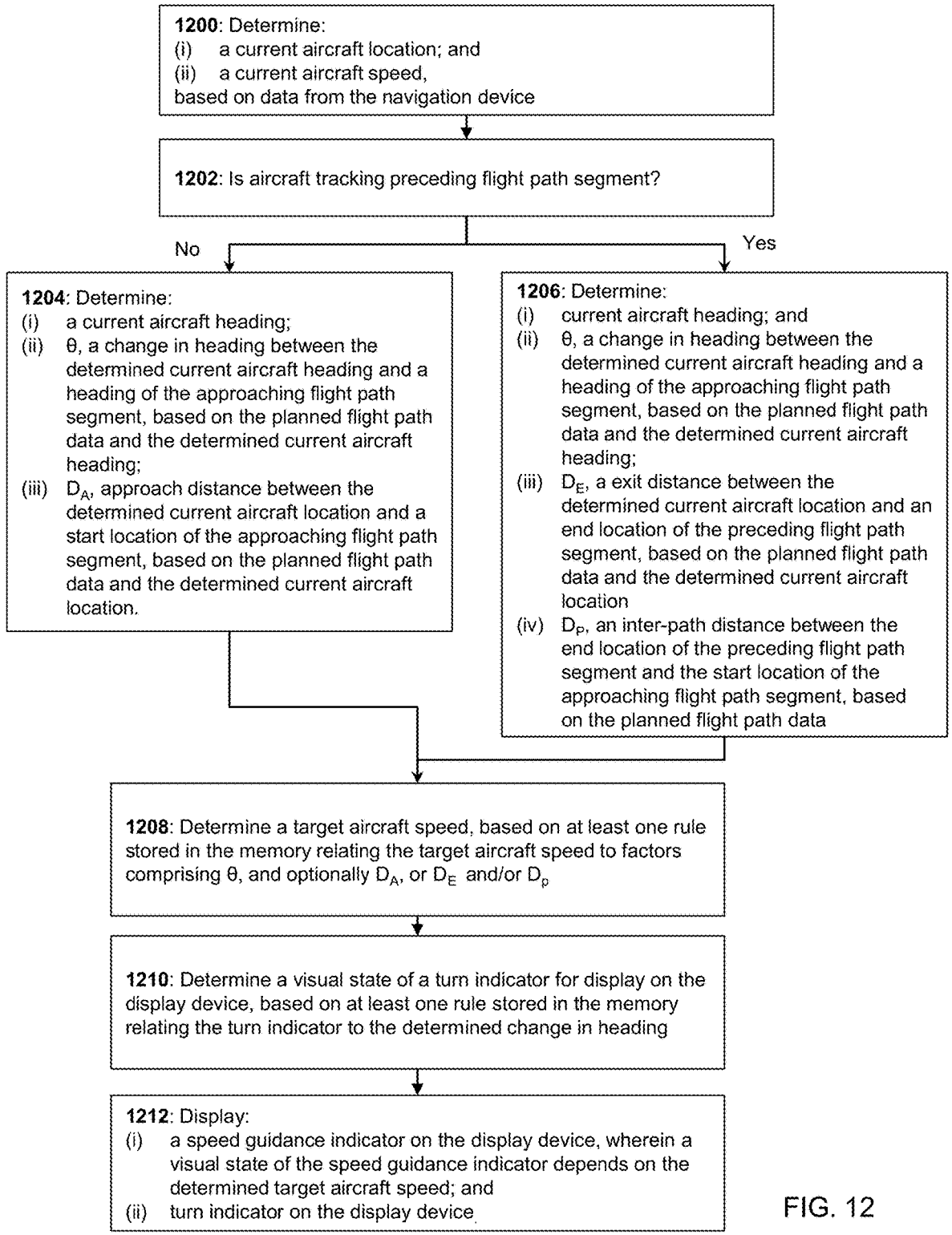
FIG. 12 shows a flow chart of an embodiment of a method for providing guidance information along a planned flight path, as implemented by a system of the present invention.

FIG. 12 shows an illustrative embodiment of a method performed by the guidance module (210). All of the steps shown are performed periodically, so that the display device (104) can be updated in real time. The guidance module (210) causes the navigation processing module (200) to periodically (e.g., on a 10 Hz frequency) determine the current location of the aircraft (10), and the current aircraft speed, based on data from the navigation device (102) (step 1200).

Figure 13:
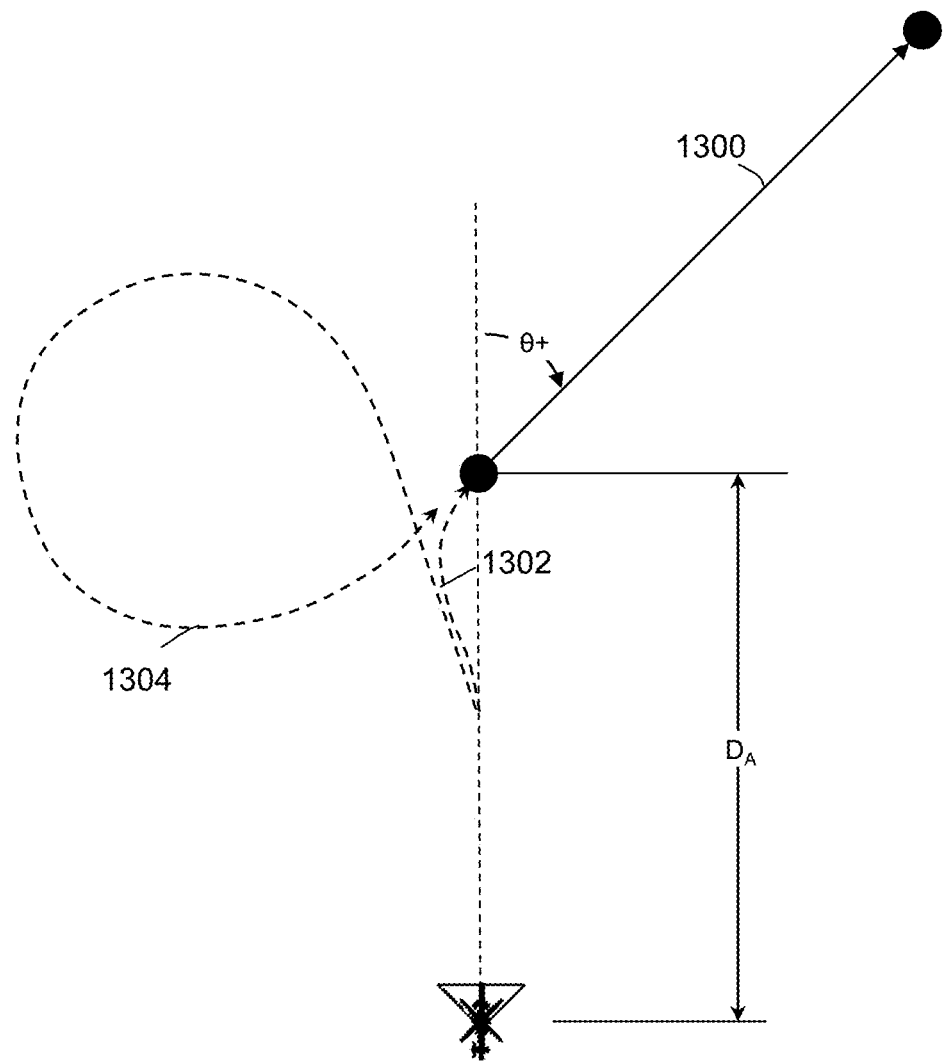
FIG. 13 shows the geometry of an aircraft approaching a planned flight path segment.

Based on the current location of the aircraft (10), the tracking module (208) periodically determines whether the aircraft (10) is or is not tracking a "preceding flight path segment" as it approaches an "approaching flight path segment". For example, as shown in FIG. 13, the aircraft (10) is not tracking a preceding flight path segment as it approaches approaching flight path segment (1300). In this scenario, the approaching flight path segment (1300) may be identified in a variety of ways. As a non-limiting example, it may be determined as the flight path segment having a start location that is most proximal to the aircraft (10). As another non-limiting example, in embodiments of the system (100) having a tracking module (208), it may be determined as the first flight path segment in the ordered sequence of the planned flight path data that has not been covered at all. The particular manner in which the approaching flight path segment is identified is not critical.

Figure 14:
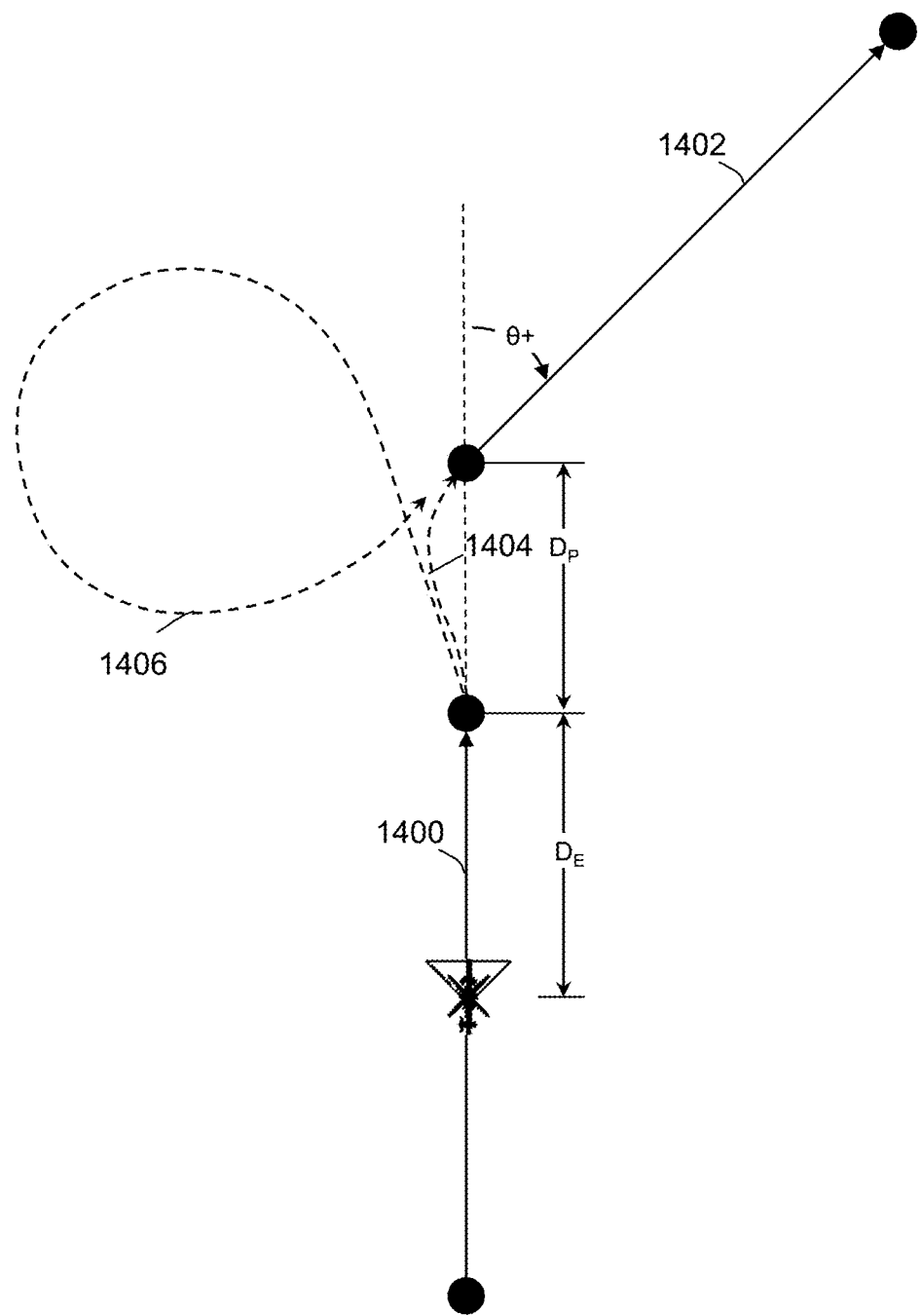
FIG. 14 shows the geometry of an aircraft tracking a planned flight path segment, and approaching a subsequent planned flight path segment.

In contrast, as shown in FIG. 14, the aircraft (10) is tracking preceding flight path segment (1400) as it approaches approaching flight path segment (1402). The preceding flight path segment (1400) is that flight path segment that immediately precedes the approach flight path segment (1402) in the ordered sequence of the planned flight path data. The identification of the tracked preceding flight path segment (1400) may be made in different ways. As a non-limiting example, this determination can be made by calculating the distance between the current location of the aircraft (10), and the flight path segment (1400), and evaluating whether this distance is within a predetermined threshold value. As another non-limiting example, this determination may be based on whether the tracking module (208) determines that the preceding flight path segment (1400) is covered by the periodically determined current field-of-view area location, as described above. Once so identified, the approaching flight path segment (1402) can be identified as the next flight path segment in the ordered sequence stored in the planned flight path data. Alternatively, the approaching flight path segment can be determined in the manner described above. The particular manner in which the preceding and approaching flight path segments are identified is not critical.

If the aircraft (10) is not tracking a preceding flight path segment (e.g., as shown in FIG. 13) (step 1204), then the guidance module (210) determines the current heading of the aircraft (10). This may be implemented by causing the navigation processing module (200) to determine the heading from data from the electronic compass. The guidance module (210) also determines, $\theta$, the change in heading between the determined current aircraft heading and the heading of the approaching flight path segment (1300), based on the planned flight path data and the determined current aircraft heading. The guidance module (210) also determines, $D_A$, the approach distance between the determined current aircraft location and a start location of the approaching flight path segment (1300), based on the planned flight path data and the determined current aircraft location.

Alternatively, if the aircraft (10) is tracking a preceding flight path segment (1400) (e.g., as shown in FIG. 14) (step 1206), then the guidance module (210) causes the navigation processing module (200) to determine the current heading of the aircraft (10) from the electronic compass. Alternatively, the heading may be determined indirectly by equating it to the heading of the preceding flight path segment (1400), which can be determined from the planned flight path data. In either case, the guidance module (210) determines, $\theta$, the change in heading between the determined current aircraft heading and the heading of the approaching flight path segment (1402), based on the planned flight path data and the determined current aircraft heading. The guidance module (210) also determines, $D_E$, the exit distance between the determined current aircraft location and an end location of one of the preceding flight path segment (1400), based on the planned flight path data and the determined current aircraft location. The guidance module (210) also determines, $D_P$, the inter-path distance between the end location of the preceding flight path segment (1400) and the start location of the approaching flight path segment (1402), based on the planned flight path data.

In either case, the guidance module (210) proceeds by determining a target aircraft speed, based on at least one rule stored in the memory relating the target aircraft speed to factors including, $\theta$. In embodiments, these factors may also include $D_A$ (if applicable), or $D_E$ and/or $D_P$ (if applicable) (step 1208). The rule may be implemented in a variety of ways. For example, a mathematical formula may relate the target aircraft speed to one or a combination of factors. As another non-limiting example, FIG. 15 provides numerous rules that can be implemented by Boolean-type tests or a lookup table in which $\theta$, in combination with $D_A$ (if applicable), or $D_E$ and/or $D_P$ (if applicable) are related to a high "ferry speed", a medium "cruise speed" or a low "turn speed", as the case may be. (As used herein, the convention for indicating the direction of $\theta$ is with positive values for a clockwise rotation as viewed from above (i.e., a right turn from the pilot's perspective), and negative values for a counter-clockwise rotation as viewed from above (i.e., a left turn from the pilot's perspective).) It will be appreciated that the values shown in FIG. 15 are provided only for illustrative purposes, and that they and the values for the ferry speed, cruise speed, and turn speed may be selected based on considerations such as the performance and maneuverability of the aircraft (10).

The implementation of these rules may be understood as follows. In the case of FIG. 12, when Dais large (e.g., Dais greater than 10 km), then the appropriate target aircraft speed may be a high ferry speed so that the aircraft (10) can approach the approaching flight path segment (1300) as quickly as possible. As the aircraft (10) approaches the approaching flight path segment (1300) (e.g., Dais between 1 km and 10 km), the appropriate target aircraft speed should be reduced to a medium cruise speed that is optimal for conducting the aerial surveying operation (e.g., to allow the surveyor onboard adequate opportunity to view the ground conditions or use instrumentation to monitor to for pipeline leaks). As the aircraft (10) further approaches the start location of the approaching flight path segment (1300), the appropriate target aircraft speed may have to be further reduced to a lower turn speed, depending on the magnitude of $\theta$. If $\theta$ is sufficiently small (e.g., $\theta$ is within 15 degrees), then the aircraft (10) may make a same-direction turning approach (1302) with the target aircraft speed remaining at the cruise speed. In contrast, if $\theta$ is larger (e.g., $\theta$ is greater than 15 degrees), a same-direction turning approach (1302) may result in the aircraft (10) missing coverage of part of the planned flight path segment (1200) given the limits of the maneuverability of the aircraft (10). Rather, the aircraft (10) has to make an opposite-direction turning approach (1304) to connect to the approaching flight path segment (1300). In this case, the appropriate target aircraft speed should reduce to a low turn speed so that the aircraft (10) can smoothly negotiate a relatively tight turn without excessive deviation from the approaching flight path segment (1300).

In the case of FIG. 14, when $D_E$ is large (e.g., $D_E$ in greater than 1 km), then the appropriate target aircraft speed may be the cruise speed. As the aircraft (10) approaches the end location of preceding flight path segment (1400) (e.g., $D_E$ is within 1 km), the appropriate target aircraft speed may need to be reduced to the turn speed, depending on the magnitude of $D_P$ and $\theta$. If $D_P$ is sufficiently large (e.g., $D_P$ is greater than 1 km), then the appropriate target aircraft speed may be maintained at the cruise speed, so that the remainder of the preceding flight path segment (1400) can be efficiently covered, since there will be adequate distance before reaching the start location of the approaching flight path segment (1402) to make further speed reductions if necessary. In contrast, if $D_P$ is small (e.g., $D_P$ is within 1 km), then the appropriate target aircraft speed have to be lowered to the turn speed, depending on the magnitude of $\theta$. If $\theta$ is sufficiently small (e.g., $\theta$ is within 15 degrees), then the aircraft (10) may make a same-direction turning approach (1404) with the target aircraft speed remaining at the cruise speed. In contrast, if $\theta$ is larger (e.g., $\theta$ is greater than 15 degrees), then the aircraft (10) may make an opposite-direction turning approach (1406) to connect to the approaching flight path segment (1402). In this case, the appropriate target aircraft speed should reduce to the turn speed so that the aircraft (10) can smoothly negotiate a relatively tight turn without excessive deviation from the approaching flight path segment (1402).

The guidance module (210) may also proceed by determining a visual state of a turn indicator for display on the display device, based on at least one rule stored in the memory relating the turn indicator to the determined change in heading (step 1210). In particular, the rules may ascertain whether the turn indicator should notify the pilot of a need for a turn in the same direction as or the opposite direction to θ, depending on whether θ is within or exceeds a predetermined value. As a non-limiting example, FIG. 15 provides numerous rules in which ranges of values of θ are related to different turn indicators in the form of icons indicating the direction and severity of the turn to be made by the aircraft (10). The rules prescribe that changes in heading, θ, having a magnitude less than 15 degrees are associated with turn indicators that indicate a same direction turn onto the approaching flight path segment, whereas change in heading, θ, having a magnitude greater than 15 degrees are associated with turn indicators that indicate an opposite direction turn onto the approaching flight path segment.

The guidance module (210) proceeds by displaying a speed guidance indicator on the display device (104) (step 1212). As a non-limiting example, the speed guidance indicator may be the determined target aircraft speed displayed in textual form or graphical form (e.g., in a speedometer-like display). As another non-limiting example, the speed guidance indicator may be a visual alert displayed in accordance with different visualization schemes (e.g., a region on the display device having a different colour, or pattern, depending on the determined target aircraft speed). As yet another non-limiting example, the speed guidance indicator may be a message in text string form, based on comparing the determined target aircraft speed to the determined current aircraft speed. If the determined target aircraft speed is the ferry speed, then the message may read "Ferry Speed". Otherwise, if the determined current aircraft speed exceeds the determined target aircraft speed, then the message may read "Slow Down". Otherwise, if the determined current aircraft speed is within the determined target aircraft speed, then the message may read "On Speed". FIG. 7, for example shows a speed guidance indicator in the form of a text field (718) at the top of the map and a text field (720) within the map displaying "Slow Down" when the current aircraft speed (shown as 255 km/h) exceeds the target aircraft speed (shown as 200 km/h). In contrast, in FIG. 9, the text field (904) has changed to "On Speed" when the current aircraft speed (shown as 195 km/h) is less than or equal to the target aircraft speed (shown as 200 km/h).

The guidance module (210) may also display a turn indicator on the display device (104) (step 1212). As a non-limiting example, the speed guidance indicator may be a visual alert displayed in textual or graphical form. In FIG. 7, for example an icon (722) (from FIG. 15) indicative of an opposite direction turn onto the approaching flight path segment is displayed when θ exceeds 15 degrees, and $D_E$ and $D_P$ are both less than 1 km. In this embodiment, the GUI also displays $D_E$ in the form of a message "Exit in 0.650 km" indicating the distance to the end of the currently tracked flight path segment. Otherwise, the icon (722) may be indicative of a same direction turn onto the approaching flight path is displayed when θ is less than or equal to 15 degrees. Once the conditions of θ, $D_E$, $D_P$ no longer prescribe the turn indicator under the rules (e.g., after the turn has been made), the guidance module (210) will update the display device (104) so that the icon (722) no longer appears.

Map Display Module. A purpose of the map display module (212) is to generate a display of a map on one or more of the display devices (204), such as the map shown in the embodiment of FIGS. 7, 9, and 11, used in conjunction with the methods implemented by the other modules as described above.

Figure 16A:
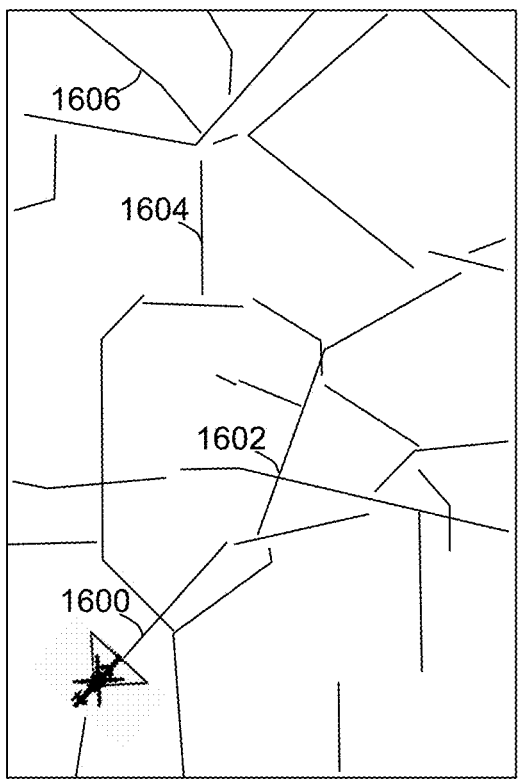
FIG. 16A shows an example of a map including numerous planned flight path segments.

Pipeline networks and their associated right of ways are often arranged in highly geometrically complex networks, with high spatial density. Accordingly, if the computer device (108) were configured to cause the display device (204) to display a map that indiscriminately includes all the planned flight path segments within a spatial region, based solely on their location falling within the spatial region, the resulting map may be such as shown in FIG. 16A where the planned flight path segments are shown by black lines. Such a map has the potential confuse a pilot who is trying to assess the appropriate sequence of flight paths, or to confuse a surveyor who is trying to mark ground conditions.

Figure 16B:
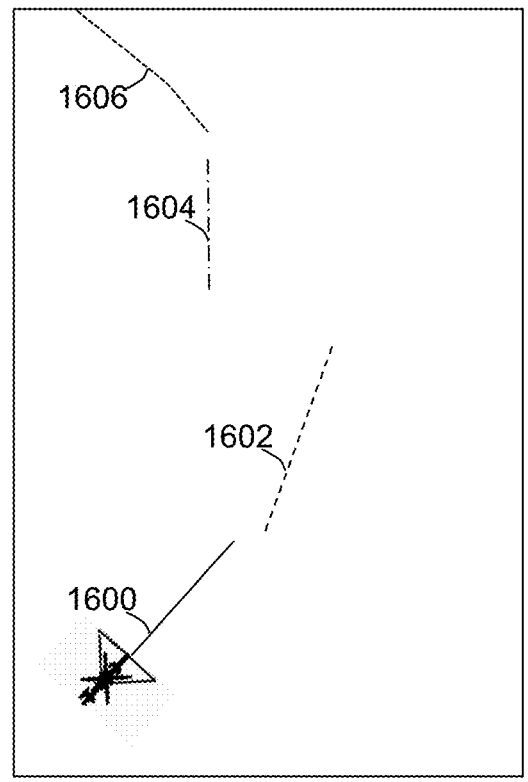
FIG. 16B shows an example of a map rendered by a display device in accordance with the present invention, where the planned flight path segments displayed is limited based on their coverage status and ordered sequence in the planned flight path data.

Accordingly, in on embodiment, the map display module (212) is configured to cause the display device (204) to limit the number of planned flight path segments displayed on the map, not only based on their spatial location, but also on the ordered sequence in which they are stored in the planned flight path data, and a "tracking distance" as determined by the tracking module (208). For example, with reference to FIG. 16B, the tracking module (208) may determine that a current flight path segment (1600) is currently being tracked by virtue of the aircraft (10) being within a predetermined threshold "tracking distance" of segment (1600). As a non-limiting example, this may be determined by virtue of that segment (1600) being geometrically intersected by the current FOV area of the aircraft (10). It will be appreciated that the predetermined threshold tracking distance should be selected to be sufficiently small to avoid multiple planned flight path segments being within the predetermined threshold tracking distance of the current aircraft location, having regard to the expected spatial density of the planned flight path segments. As a non-limiting example, an appropriate predetermined threshold tracking distance may be set to less than 10 meters, less than 5 meters, or less than 1 meter. In embodiments, the predetermined threshold tracking distance may be user programmable. The map display module (212) may then cause the display device (204) to display only a limited number of flight path segments that follow the current segment (1600) in the ordered sequence of planned flight path data stored by the planned flight path data storage module (202). In one embodiment as shown in FIG. 16B, for example, the map display module (212) may cause the display device (204) to display only the subsequent three segments (1602, 1604, 1606). In other embodiments, the number of subsequent segments to be displayed may be varied so as to be an integer number less than or greater than three. In embodiments, the number of subsequent segments to be displayed may be user programmable so as to be selectable by the user (e.g., using a graphical user interface and an input device). Moreover, each of the segments (1600, 1602, 1604, and 1606) may be displayed in accordance with a visualization scheme that is unique in terms of color, pattern, line weight, or other visual quality discernible to the human viewer, so as to indicate the sequence of the flight paths. For example, in the embodiment shown in FIG. 16B, the segments (1600, 1602, 1604, and 1606) are shown with different line patterns, that may correspond to different colors (e.g., red, orange, yellow, and blue, respectively).

Figure 16C:
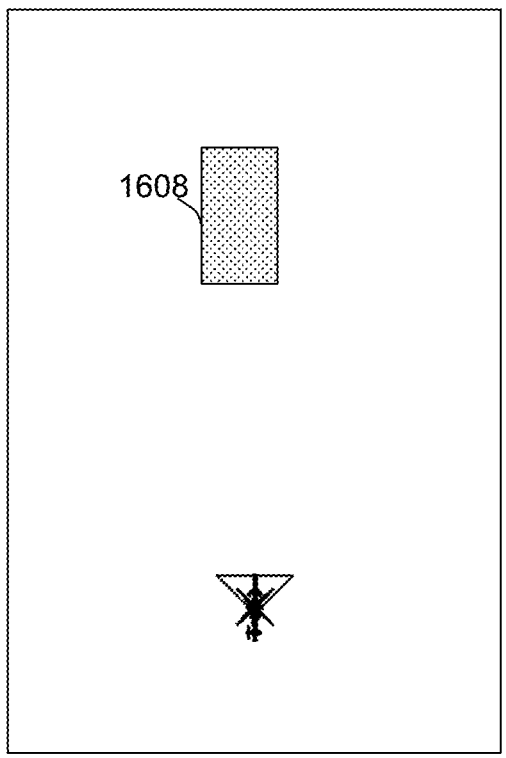
FIG. 16C shows an example of a map rendered by display device in accordance with the present invention, where a region is indicator is displayed when the distance between the aircraft and the planned flight path segment exceeds a threshold distance.

In another embodiment, the map display module (212) is also configured to cause the display device (204) to display only a region indicator (1608) when the "start distance" between the aircraft (10) and the first or next flight path segment in the ordered sequence exceeds a predetermined threshold distance. For example, with reference to FIG. 16C, the navigation processing module (200) may determine the location of the aircraft (10), and the map display module (212) may determine the distance between the aircraft (10) and the start location of the first or next flight path segment (1608). If that distance exceeds a predetermined threshold distance (e.g., 25 km, or 50 km), then the map display module (212) does not display the planned flight path segments at all on the map. Rather, the map display module (212) displays on the map a region indicator (1608) that has a location on the map that is based on at least one of the planned flight path segments. As a non-limiting example, in FIG. 16C, the region indicator (1608) is shown as a rectangular region, rendered with semi-transparent shading. In this embodiment, the map display module (212) configures the location and size of the region indicator (1608) to overlap the location of all of the planned flight path segments so as to indicate the general area to be covered by the aerial survey. In other embodiments, the region indicator may have different shapes, outlines, and fills, so long as it has a visual quality that is discernible to the human viewer. As another non-limiting example, the region indicator may be an icon having a position based on the location of the first planned flight path in the ordered sequence.

The functionality of the map display module (212) as described above helps to avoid confusing the pilot when conducting an aerial survey of a geometrically complex and spatially dense pipeline network. Also, by limiting the number of flight path segments that need to be rendered and updated by the display device (204) in real time, or by displaying a region indicator instead of flight path segments, the map display module (212) decreases the computational workload on the computer device (108). For example, in practical usage, the planned flight path data may describe 7000 planned flight path segments. The computational workload associated with determining whether to render each and every one of these flight path segments based on their location, as the map is updated in real time, is non-trivial and may "choke" the computer device (108) and cause the map to be updated in an unsmooth manner. In contrast, the map display module (212) as described above need not be concerned with determining whether all of the planned flight path segments should be rendered by the display device (204) on the map. Rather the map display module (212) may consider only on the tracked segment and a limited number of subsequent segments in the ordered sequence, or even render only a region indicator (1608).

Interpretation. Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for marking ground conditions during an aerial survey, the method performed by a computer device comprising a pilot display device for viewing by a pilot, a surveyor display device for viewing by a surveyor, an input device for use by the surveyor, a computer processor, and a memory comprising at least one non-transitory computer-readable medium storing planned flight path data, and a GPS receiver operatively connected to the computer device, the method comprising:
periodically determining a current aircraft location based on data from the GPS receiver;
periodically updating a map displayed by the pilot display device and the surveyor display device, wherein the map shows a marker for the aircraft at the determined current aircraft location in relation to the planned flight path; and
in response to receiving, from the input device, a request to input new ground condition data:
determining a new ground condition location based on the determined current aircraft location;
storing, in the memory, the new ground condition data comprising the determined new ground condition location; and
updating the map displayed by the pilot display device and the surveyor display device to show a marker for the new ground condition data at the determined new ground condition location.

2. The method of claim 1, wherein the new ground condition data further comprises a time, a date, or both the time and the date, at which the request to input new ground condition data is received.

3. The method of claim 1, wherein:
the method further comprises displaying, on the surveyor display device, a graphical user interface for inputting the request to input new ground condition data, wherein the graphical user interface comprises a plurality of selectable buttons each of which is associated with a different type of ground condition;
the request to input new ground condition data is received upon one of the buttons being selected; and
the type of ground condition associated with the selected one of the buttons is stored in the memory as part of the new ground condition data.

4. The method of claim 1, wherein the memory further stores previous ground condition data comprising a previous ground condition location, and the method further comprises:
updating the map displayed by the pilot display device and the surveyor display device to show a marker for the previous ground condition data at the previous ground condition location; and
in response to receiving, from the input device, a request to input an update to the previous ground condition data:
displaying, on the surveyor display device, a graphical user interface for inputting the update to previous ground condition data; and
updating, in the memory, the previous ground condition data with the update to the previous ground condition data.

5. The method of claim 4, wherein the request to input the update to previous ground condition data is received upon the marker for the previous ground condition being selected using the input device.

6. The method of claim 1, wherein the computer device further comprises an auditor display device for viewing by an auditor, and wherein:
the map is displayed by the auditor device, and the method further comprises periodically updating the map displayed by the auditor display device; and
the method further comprises, in response to receiving, from the input device, the request to input new ground condition data, updating the map displayed by the auditor display device to show the marker for the new ground condition data at the determined new ground condition location.

7. A system for marking ground conditions during an aerial survey, the system comprising:
a GPS receiver;
a computer device operatively connected to the GPS receiver, and comprising:
a pilot display device for viewing by a pilot;
a surveyor display device for viewing by a surveyor;
an input device for use by the surveyor;
a computer processor; and
a memory comprising a least one non-transitory computer-readable medium;
wherein the memory stores a planned flight path, and a set of instructions executable by the computer processor to implement a method comprising:
periodically determining a current aircraft location based on data from the GPS receiver;
periodically updating a map displayed by the pilot display device and the surveyor display device, wherein the map shows a marker for the aircraft at the determined current aircraft location in relation to the planned flight path; and
in response to receiving, from the input device, a request to input new ground condition data:
determining a new ground condition location based on the determined current aircraft location;
storing, in the memory, the new ground condition data comprising the determined new ground condition location; and
updating the map displayed by the pilot display device and the surveyor display device to show a marker for the new ground condition data at the determined new ground condition location.

8. The system of claim 7, wherein the new ground condition data further comprises a time, a date, or both the time and the date, at which the request to input new ground condition data is received.

9. The system of claim 7, wherein:
the method further comprises displaying, on the surveyor display device, a graphical user interface for inputting the request to input new ground condition data, wherein the graphical user interface comprises a plurality of selectable buttons each of which is associated with a different type of ground condition;

the request to input new ground condition data is received upon one of the buttons being selected; and the type of ground condition associated with the selected one of the buttons is stored in the memory as part of the new ground condition data.

10. The system of claim 7, wherein the memory further stores previous ground condition data comprising a previous ground condition location, and the method further comprises:

updating the map displayed by the pilot display device and the surveyor display device to show a marker for the previous ground condition data at the previous ground condition location; and in response to receiving, from the input device, a request to input an update to the previous ground condition data:

displaying, on the surveyor display device, a graphical user interface for inputting the update to previous ground condition data; and updating, in the memory, the previous ground condition data with the update to the previous ground condition data.

11. The system of claim 10, wherein the request to input the update to previous ground condition data is received upon the marker for the previous ground condition being selected using the input device.

12. The system of claim 7, wherein the system further comprises an auditor display device for viewing by an auditor, and wherein:

the map is displayed by the auditor device, and the method further comprises periodically updating the map displayed by the auditor display device; and the method further comprises, in response to receiving, from the input device, the request to input new ground condition data, updating the map displayed by the auditor display device to show the marker for the new ground condition data at the determined new ground condition location.

13. A non-transitory computer readable medium storing a set of instructions executable by a computer device comprising a pilot display device for viewing by a pilot, a surveyor display device for viewing by a surveyor, an input device for use by the surveyor, a computer processor, and a memory storing planned flight path data, and a GPS receiver operatively connected to the computer device, to implement a method for marking ground conditions during an aerial survey, the method comprising:

periodically determining a current aircraft location based on data from the GPS receiver;

periodically updating a map displayed by the pilot display device and the surveyor display device, wherein the map shows a marker for the aircraft at the determined current aircraft location in relation to the planned flight path; and in response to receiving, from the input device, a request to input new ground condition data:

determining a new ground condition location based on the determined current aircraft location;

storing, in the memory, the new ground condition data comprising the determined new ground condition location; and updating the map displayed by the pilot display device and the surveyor display device to show a marker for the new ground condition data at the determined new ground condition location.

14. The non-transitory computer readable medium of claim 13, wherein the new ground condition data further comprises a time, a date, or both the time and the date, at which the request to input new ground condition data is received.

15. The non-transitory computer readable medium of claim 13, wherein:

the method further comprises displaying, on the surveyor display device, a graphical user interface for inputting the request to input new ground condition data, wherein the graphical user interface comprises a plurality of selectable buttons each of which is associated with a different type of ground condition;

the request to input new ground condition data is received upon one of the buttons being selected; and the type of ground condition associated with the selected one of the buttons is stored in the memory as part of the new ground condition data.

16. The non-transitory computer readable medium of claim 13, wherein the memory further stores previous ground condition data comprising a previous ground condition location, and the method further comprises:

updating the map displayed by the pilot display device and the surveyor display device to show a marker for the previous ground condition data at the previous ground condition location; and in response to receiving, from the input device, a request to input an update to the previous ground condition data:

displaying, on the surveyor display device, a graphical user interface for inputting the update to previous ground condition data; and updating, in the memory, the previous ground condition data with the update to the previous ground condition data.

17. The non-transitory computer readable medium of claim 16, wherein the request to input the update to previous ground condition data is received upon the marker for the previous ground condition being selected using the input device.

18. The non-transitory computer readable medium of claim 13, wherein the computer device further comprises an auditor display device for viewing by an auditor, and wherein:

the map is displayed by the auditor device, and the method further comprises periodically updating the map displayed by the auditor display device; and the method further comprises, in response to receiving, from the input device, the request to input new ground condition data, updating the map displayed by the auditor display device to show the marker for the new ground condition data at the determined new ground condition location.

* * * * *